(12) United States Patent
Huang et al.

(10) Patent No.: US 12,225,462 B2
(45) Date of Patent: Feb. 11, 2025

(54) CONTROL INFORMATION TRANSMISSION METHOD AND DEVICE

(71) Applicant: HUAWEI TECHNOLOGIES CO., LTD., Guangdong (CN)

(72) Inventors: Wenwen Huang, Shanghai (CN); Meng Hua, Shanghai (CN); Xiaolei Tie, Shanghai (CN); Shurong Jiao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 865 days.

(21) Appl. No.: 17/169,846

(22) Filed: Feb. 8, 2021

(65) Prior Publication Data

US 2021/0168715 A1  Jun. 3, 2021

Related U.S. Application Data

(63) Continuation of application No. PCT/CN2019/097499, filed on Jul. 24, 2019.

(30) Foreign Application Priority Data

Aug. 9, 2018 (CN) .......................... 201810904181.9

(51) Int. Cl.
*H04B 7/185* (2006.01)
*H04W 24/08* (2009.01)
(Continued)

(52) U.S. Cl.
CPC ....... *H04W 52/0225* (2013.01); *H04W 24/08* (2013.01); *H04W 52/0274* (2013.01); *H04W 72/0446* (2013.01); *H04W 72/23* (2023.01)

(58) Field of Classification Search
CPC . H04W 72/23; H04W 72/0446; H04W 24/08; H04W 52/0274
(Continued)

(56) References Cited

U.S. PATENT DOCUMENTS

2013/0182626 A1  7/2013  Kuo
2017/0086172 A1  3/2017  Dinan
(Continued)

FOREIGN PATENT DOCUMENTS

CN  102487541 A  6/2012
CN  104969600 A  10/2015
(Continued)

OTHER PUBLICATIONS

Office Action in Chinese Appln. No. 202210770712.6, dated Jan. 19, 2023, 7 pages.
(Continued)

*Primary Examiner* — Temica M Beamer
(74) *Attorney, Agent, or Firm* — Fish & Richardson P.C.

(57) ABSTRACT

This application discloses a control information transmission method and device, and relates to the field of communications technologies, to reduce power consumption of UE. The control information transmission method provided in embodiments of this application includes: receiving, by user equipment UE, first indication information sent by a base station, where the first indication information indicates a first time window; and stopping, by the UE, monitoring a physical downlink control channel PDCCH in the first time window.

20 Claims, 20 Drawing Sheets

(51) Int. Cl.
*H04W 52/02* (2009.01)
*H04W 72/0446* (2023.01)
*H04W 72/23* (2023.01)

(58) Field of Classification Search
USPC .......................................................... 370/318
See application file for complete search history.

(56) References Cited

U.S. PATENT DOCUMENTS

| | | | |
|---|---|---|---|
| 2017/0332410 A1 | 11/2017 | Babaei et al. | |
| 2019/0215896 A1* | 7/2019 | Zhou | H04L 1/0027 |
| 2020/0313833 A1* | 10/2020 | Yi | H04L 5/001 |
| 2021/0076445 A1* | 3/2021 | Tsai | H04W 74/0833 |

FOREIGN PATENT DOCUMENTS

| | | | |
|---|---|---|---|
| CN | 106533633 A | 3/2017 | |
| CN | 106604376 A | 4/2017 | |
| CN | 109429258 A | 3/2019 | |
| CN | 109963339 A | 7/2019 | |
| EP | 3609109 A1 | 2/2020 | |
| WO | 2014153698 A1 | 10/2014 | |

OTHER PUBLICATIONS

3GPP TS 38.212 V15.2.0 (Jun. 2018), "3rd Generation Partnership Project; Technical Specification Group Radio Access Network;NR;Multiplexing and channel coding(Release 15)," Jun. 2018, 98 pages.
3GPP TS 38.213 V15.2.0 (Jun. 2018), "3rd Generation Partnership Project; Technical Specification Group Radio Access Network; NR;Physical layer procedures for control(Release 15)," Jun. 2018, 99 pages.
3GPP TS 38.321 V15.2.0 (Jun. 2018), "3rd Generation Partnership Project; Technical Specification Group Radio Access Network; NR;Medium Access Control (MAC) protocol specification(Release 15)," Jun. 2018, 73 pages.
3GPP TS 38.331 V15.2.0 (Jun. 2018), "3rd Generation Partnership Project; Technical Specification Group Radio Access Network;NR;Radio Resource Control (RRC) protocol specification(Release 15)," Jun. 2018, 304 pages.
Asustek, "Discussion on beam failure recovery request in NR," 3GPP TSG-RAN WG2 Meeting #Ad-hoc1801, R2-1800042, Vancouver, Canada, Jan. 22-26, 2018, 4 pages.
Catt et al., "New SID: Study on UE Power Saving in NR," 3GPP TSG RAN Meetings #80, RP-181463, La Jolla, USA, Jun. 11-14, 2018, 5 pages.
MediaTek Inc., "On UE power saving for NR," 3GPP TSG RAN WG1 RAN1 Meeting #93, R1-1806803, Busan, Korea, May 21-25, 2018, 4 pages.
Office Action issued in Chinese Application No. 201810904181.9 on Jun. 5, 2020, 17 pages (with English translation).
PCT International Search Report and Written Opinion issued in International Application No. PCT/CN2019/097499 on Oct. 15, 2019, 19 pages (with English translation).
Extended European Search Report issued in European Application No. 19847414.0 on Aug. 26, 2021, 13 pages.
Huawei, HiSilicon et al., "Power saving schemes," 3GPP TSG RAN WG1 Meeting #96, R1-1901572, Athens, Greece, Feb. 25-Mar. 1, 2019, 20 pages.
Samsung et al., "Search Space Design," 3GPP TSG RAN WG1 Meeting #90, R1-1713613, Prague, Czechia, Aug. 21-25, 2017, 6 pages.

* cited by examiner

//; # CONTROL INFORMATION TRANSMISSION METHOD AND DEVICE

CROSS-REFERENCE TO RELATED APPLICATIONS

This application is a continuation of International Application No. PCT/CN2019/097499, filed on Jul. 24, 2019, which claims priority to Chinese Patent Application 201810904181.9, filed on Aug. 9, 2018. The disclosures of the aforementioned applications are hereby incorporated by reference in their entireties.

TECHNICAL FIELD

Embodiments of this application relate to the field of communications technologies, and in particular, to a control information transmission method and device.

BACKGROUND

Currently, it is proposed in 3GPP (the 3rd generation partnership project, 3rd generation partnership project) Release 16 (Release 16) that power consumption of NR (new radio, new radio) user equipment (user equipment, UE) needs to be optimized. One of factors that waste power of the UE is monitoring on a physical downlink control channel (physical downlink control channel, PDCCH). A base station configures a control resource set (control resource set, CORESET) and a search space set (search space set) by using radio resource control (radio resource control, RRC) signaling, where the control resource set and the search space set are used to send a PDCCH, and the PDCCH is used to carry scheduling information of data. The UE needs to monitor a PDCCH at locations indicated by the CORESET and the search space set, to obtain the scheduling information. If the PDCCH has the scheduling information, the UE receives, based on the scheduling information, data sent by using a physical downlink shared channel (physical downlink shared channel, PDSCH). However, in many cases, the base station does not continuously have data to send to the UE, and not all PDCCHs carry scheduling information, but the UE still needs to continuously monitor or periodically monitor the PDCCHs at the locations indicated by the CORESET and the search space set. This causes power consumption.

SUMMARY

Embodiments of this application provide a control information transmission method and device, to reduce power consumption of UE.

To achieve the foregoing objectives, the following technical solutions are used in the embodiments of this application.

According to a first aspect, a control information transmission method is provided. The control information transmission method is applied to user equipment UE or a chip in UE. Specifically, the control information transmission method provided in this embodiment of this application is: receiving, by user equipment UE, first indication information sent by a base station, where the first indication information indicate a first time window; and skipping, by the UE, monitoring a physical downlink control channel PDCCH in the first time window. In this way, the UE skips monitoring the PDCCH in the first time window as indicated by the base station, thereby reducing power consumption of the UE. For example, when the base station has no data to transmit to the UE, the base station does not need to send scheduling information to the UE by using the PDCCH in a following time. In this way, the base station directly indicates the UE to skip monitoring the PDCCH in the following time. Compared with the prior art in which the PDCCH is periodically monitored, in the method provided in this embodiment of this application, the base station may actively trigger, in real time, the UE to stop monitoring the PDCCH, thereby reducing the power consumption of the UE.

Optionally, to indicate the first time window to the UE by using the first indication information, the first indication information includes at least one of the following: duration of the first time window; or a start location of the first time window.

More specifically, when the first time window may include at least one slot, and the first indication information includes the duration of the first time window, the receiving, by UE, first indication information sent by a base station includes: receiving, by the UE in a first slot, the first indication information sent by the base station; and determining, by the UE, an $X^{th}$ slot after the first slot as a start slot of the first time window, and determining, by the UE, the first time window based on the start slot and the duration of the first time window.

In addition, if the base station sends the scheduling information to the UE before sending the first indication information, before the UE receives the first indication information sent by the base station, the method further includes: receiving, by the UE, the scheduling information sent by the base station, where the scheduling information indicate information about a time domain for sending data by the base station to the UE. In this case, the UE determines a next slot of an end of a PDSCH transmission slot as the start slot of the first time window, and the UE determines the first time window based on the start slot and the duration of the first time window. The first indication information and the scheduling information may be separately sent, or may be carried in same DCI.

When the first indication information includes the start location of the first time window, the UE determines the first time window based on predetermined window duration and the start location of the first time window, where the predetermined window duration indicate the duration of the first time window. The predetermined window duration may be fixed duration, or any duration preconfigured by the base station.

In addition, the first indication information may further include both the duration of the first time window and the start location of the first time window.

In addition, the first indication information is sent by using downlink control information DCI. For example, the DCI may be group common signaling.

According to a second aspect, a control information transmission apparatus is provided. The control information transmission apparatus is user equipment UE or a chip in UE. Specifically, the control information transmission apparatus includes a receiving unit and a processing unit. Functions implemented by the units and modules provided in this application are specifically as follows: The receiving unit is configured to receive first indication information sent by a base station, where the first indication information indicate a first time window. The processing unit is configured to skip monitoring a physical downlink control channel PDCCH in the first time window indicated by the first indication information received by the receiving unit.

Optionally, the first indication information includes at least one of the following: duration of the first time window; or a start location of the first time window.

More specifically, when the first time window may include at least one slot, and the first indication information includes the duration of the first time window, the receiving unit is specifically configured to receive, in a first slot, the first indication information sent by the base station; and the processing unit is configured to: determine an $X^{th}$ slot after the first slot as a start slot of the first time window, and determine the first time window based on the start slot and the duration of the first time window.

In addition, if the base station sends scheduling information to the UE before sending the first indication information, the receiving unit is further configured to receive the scheduling information sent by the base station, where the scheduling information indicate the base station to send data to the UE in a predetermined slot. In this case, the processing unit is configured to: determine a next slot of the predetermined slot as the start slot of the first time window, and determine the first time window based on the start slot and the duration of the first time window. The first indication information and the scheduling information may be separately sent, or may be carried in same DCI.

When the first indication information includes the start location of the first time window, the processing unit is configured to determine the first time window based on predetermined window duration and the start location of the first time window, where the predetermined window duration indicate the duration of the first time window. The predetermined window duration may be fixed duration, or any duration preconfigured by the base station.

In addition, the first indication information may further include both the duration of the first time window and the start location of the first time window.

Optionally, the first indication information is sent by using downlink control information DCI. For example, the DCI is group common signaling.

According to a third aspect, a control information transmission method is provided. The control information transmission method is applied to user equipment UE or a chip in UE. Specifically, the control information transmission method provided in this embodiment of this application is: receiving, by user equipment UE, first indication information sent by a base station, where the first indication information indicate a first time window; receiving, by the UE, second indication information sent by the base station, where the second indication information indicate a second time window; determining, by the UE, a third time window based on the first time window and the second time window; and skipping, by the UE, monitoring a physical downlink control channel PDCCH in the third time window. In the foregoing solution, the UE determines the third time window based on the first time window and the second time window as indicated by the base station, and stops monitoring the PDCCH in the third time window, thereby reducing power consumption of the UE. In addition, the base station may adjust, in time, the time window in real time based on a factor such as a scheduling policy or a service requirement. In this way, data transmission efficiency is improved. For example, the base station may need to re-indicate a time window in which the UE skips detecting the PDCCH. Therefore, in this application, a new piece of second indication information may be further sent to indicate the second time window. After the UE receives the first indication information, if the base station sends the second indication information, the UE then receives the second indication information. The time window in which the UE finally skips detecting the PDCCH depends on a relationship between the first time window corresponding to the first indication information and the second time window corresponding to the second indication information.

Optionally, the first time window does not overlap the second time window, or the first time window overlaps the second time window.

Optionally, when the first time window does not overlap the second time window, the determining, by the UE, a third time window based on the first time window and the second time window includes the following three processing manners:

Manner 1: Because the first time window does not overlap the second time window, the first indication information and the second indication information may be controlled separately. In this case, the UE determines, based on the first time window and the second time window, that the third time window is the first time window and the second time window.

Manner 2: When the first indication information and the second indication information are two pieces of indication information that are continuously sent, and only the second indication information sent later may be considered to be valid, the UE determines, based on the first time window and the second time window, that the third time window is the second time window.

Manner 3: When the first indication information and the second indication information are two pieces of indication information that are continuously sent, and only the first indication information sent earlier may be considered to be valid, the UE determines, based on the first time window and the second time window, that the third time window is the first time window.

Optionally, when the first time window overlaps the second time window, the determining, by the UE, a third time window based on the first time window and the second time window includes:

if the second time window includes the first time window, or the first time window includes the second time window, determining that the third time window is the second time window, or determining that the third time window is the first time window; or if a start location of the first time window is before a start location of the second time window, and an end location of the first time window is between the start location and an end location of the second time window, determining that the third time window is from the start location of the first time window to the end location of the second time window. Alternatively, when the first indication information and the second indication information are two pieces of indication information that are continuously sent, and only the second indication information sent later may be considered to be valid, the UE determines, based on the first time window and the second time window, that the third time window is the second time window. When the first indication information and the second indication information are two pieces of indication information that are continuously sent, and only the first indication information sent earlier may be considered to be valid, the UE determines, based on the first time window and the second time window, that the third time window is the first time window.

Optionally, the first indication information and/or the second indication information is sent by using downlink control information DC. For example, the DCI is group common signaling.

According to a fourth aspect, a control information transmission apparatus is provided. The control information transmission apparatus is user equipment UE or a chip in UE. Specifically, the control information transmission apparatus includes a receiving unit and a processing unit. Functions implemented by the units and modules provided in this application are specifically as follows: The receiving unit is configured to receive first indication information sent by a base station, where the first indication information indicate a first time window; and further configured to receive second indication information sent by the base station, where the second indication information indicate a second time window. The processing unit is configured to determine a third time window based on the first time window indicated by the first indication information and the second time window indicated by the second indication information that are received by the receiving unit, and the processing unit is further configured to skip monitoring a physical downlink control channel PDCCH in the third time window.

Optionally, the first time window does not overlap the second time window, or the first time window overlaps the second time window.

Optionally, when the first time window does not overlap the second time window, the processing unit is specifically configured to: determine, based on the first time window and the second time window, that the third time window is the first time window and the second time window, or determine that the third time window is the first time window or the second time window.

Optionally, when the first time window overlaps the second time window, the processing unit is specifically configured to: if the second time window includes the first time window, or the first time window includes the second time window, determine that the third time window is the second time window, or determine that the third time window is the first time window; or the processing unit is specifically configured to: if a start location of the first time window is before a start location of the second time window, and an end location of the first time window is between the start location and an end location of the second time window, determine that the third time window is from the start location of the first time window to the end location of the second time window, or determine that the third time window is the first time window or the second time window.

Optionally, the first indication information and/or the second indication information is sent by using downlink control information DC. For example, the DCI is group common signaling.

According to a fifth aspect, a control information transmission method is provided. The control information transmission method is applied to user equipment UE or a chip in UE. Specifically, the control information transmission method provided in this embodiment of this application is: receiving, by user equipment UE, first indication information sent by a base station, where the first indication information indicate a first time window; sending, by the UE, a scheduling request to the base station; monitoring, by the UE, a physical downlink control channel PDCCH in a predetermined time after a time location of the scheduling request; and when the predetermined time is in the first time window, skipping, by the UE, monitoring the PDCCH from a start location of the first time window to a start location of the predetermined time; or when the predetermined time is after the first time window, skipping, by the UE, monitoring the PDCCH in the first time window; or when the predetermined time is before the first time window, monitoring, by the UE, the PDCCH in the first time window. In the foregoing solution, the base station sends the first indication information to the UE, to indicate the UE to skip monitoring the PDCCH in the following first time window. In this way, the UE is in a low power consumption state in the first time window. However, after the UE receives the first indication information, if the UE needs to send uplink data, the UE first sends a scheduling request SR to the base station. After receiving the SR, the base station sends uplink scheduling information to the UE by using the PDCCH, and the UE receives the PDCCH to obtain the uplink scheduling information, and sends the uplink data to the base station based on the uplink scheduling information. If the base station sends the uplink scheduling information to the UE in the first time window by using the PDCCH, the UE needs to monitor the PDCCH in the first time window. In this case, the UE is in a high power consumption state. In this way, based on a location relationship between the scheduling request and the first time window, when the predetermined time is in the first time window, the UE skips monitoring the PDCCH from the start location of the first time window to the start location of the predetermined time. In this way, power consumption of the UE is reduced. Because the UE monitors the PDCCH from the start location of the predetermined time to the end location of the first time window instead of monitoring the PDCCH after the first time window ends, a transmission delay is reduced. When the predetermined time is after the first time window, the UE receives the first indication information sent by the base station, and the UE stops monitoring the PDCCH in the first time window. In this way, the power consumption of the UE is reduced. However, when the predetermined time is before the first time window, the UE starts to monitor the PDCCH from the predetermined time, that is, the UE monitors the PDCCH also in the first time window, so that a transmission delay is reduced.

Optionally, when the UE is in the low power consumption state, when the UE sends an SR to the base station, the UE switches to the high power consumption state in the predetermined time after the time location of the scheduling request.

Optionally, the first indication information is sent by using downlink control information DCI. For example, the DCI is group common signaling.

According to a sixth aspect, a control information transmission apparatus is provided. The control information transmission apparatus is user equipment UE or a chip in UE. Specifically, the control information transmission apparatus includes a receiving unit, a sending unit, and a processing unit. Functions implemented by the units and modules provided in this application are specifically as follows: The receiving unit is configured to receive first indication information sent by a base station, where the first indication information indicate a first time window. The sending unit is configured to send a scheduling request to the base station. The processing unit is configured to monitor a physical downlink control channel PDCCH in a predetermined time after a time location of the scheduling request. The processing unit is further configured to: when the predetermined time is in the first time window, skip monitoring the PDCCH from a start location of the first time window to a start location of the predetermined time; or the processing unit is further configured to: when the predetermined time is after the first time window, skip monitoring the PDCCH in the first time window; or the processing unit is further configured to: when the predetermined time is before the first time window, skip monitoring the PDCCH in the first time window.

Optionally, the first indication information is sent by using downlink control information DCI. For example, the DCI is group common signaling.

According to a seventh aspect, a control information transmission method is provided. The control information transmission method is applied to user equipment UE or a chip in UE. Specifically, the control information transmission method provided in this embodiment of this application is: receiving, by the user equipment UE, first indication information sent by a base station, where the first indication information indicate a search space set in which a PDCCH is not monitored; and skipping, by the UE, monitoring the PDCCH in the search space set indicated by the first indication information. In this way, the UE may skip, based on the first indication information sent by the base station, monitoring the PDCCH in the search space set indicated by the first indication information. Compared with the prior art in which the PDCCH is periodically monitored, in the method provided in this embodiment of this application, the base station may actively trigger, in real time, the UE to stop monitoring the PDCCH, thereby reducing power consumption of the UE.

Optionally, the first indication information is sent by using a current search space set, and indicates the UE to skip monitoring a PDCCH in the current search space set. For example, an identifier 1 indicate that a PDCCH in the current search space set is not monitored, and an identifier 0 indicate that a PDCCH in a predetermined search space set is to be monitored.

Optionally, the first indication information is sent by using a predetermined search space set, and the first indication information may be used to indicate to skip monitoring a PDCCH of another search space set. In this case, the method further includes: obtaining, by the UE, configuration information, where the configuration information includes at least one group identifier, and each group identifier corresponds to a group of search space sets; and the first indication information includes the at least one group identifier, and the skipping, by the UE, monitoring the PDCCH in the search space set indicated by the first indication information specifically includes: skipping, by the UE, monitoring the PDCCH in the search space sets that correspond to the group identifier and that are indicated by the first indication information.

Optionally, a manner of grouping a plurality of search space sets includes: performing grouping based on PDCCH monitoring periodicities, performing classification based on types of the search space sets, performing classification based on carriers of the search space sets, and performing grouping based on bandwidth parts BWPs (bandwidth part).

When the UE skips monitoring the PDCCH in a first group of search space sets (for example, when the UE is in the first time window), the base station sends fourth indication information by using one search space set in a second group of search space sets, to indicate the UE to monitor the PDCCH in the first group of search space sets. For example, the fourth indication information may be a DCI indication.

In addition, if a monitoring periodicity of a first search space set is shorter than a monitoring periodicity of a second search space set, and a PDCCH monitoring time in the monitoring periodicity of the second search space set is included in a PDCCH monitoring time in the monitoring periodicity of the first search space set, even if the UE is indicated to skip monitoring the PDCCH in the first search space set with a relatively short monitoring periodicity, when the UE monitors the PDCCH in the second search space set with a relatively long monitoring periodicity, the UE monitors the PDCCH in the first search space set with a relatively short monitoring periodicity based on the monitoring periodicity of the second search space set with a relatively long monitoring periodicity.

Optionally, the first indication information is sent by using downlink control information DCI. For example, the DCI is group common signaling.

According to an eighth aspect, a control information transmission apparatus is provided. The control information transmission apparatus is user equipment UE or a chip in UE. Specifically, the control information transmission apparatus includes a receiving unit and a processing unit. Functions implemented by the units and the modules provided in this application are specifically as follows: The receiving unit is configured to receive first indication information sent by a base station, where the first indication information indicate a search space set in which a PDCCH is not monitored. The processing unit is configured to skip monitoring the PDCCH in the search space set indicated by the first indication information.

Optionally, the control information transmission apparatus further includes an obtaining unit, configured to obtain configuration information, where the configuration information includes at least one group identifier, and each group identifier corresponds to a group of search space sets, and the first indication information includes the at least one group identifier, and the processing unit is specifically configured to skip monitoring the PDCCH in the search space sets that correspond to the group identifier and that are indicated by the first indication information.

Optionally, the first indication information is sent by using downlink control information DCI. For example, the DCI is group common signaling.

According to a ninth aspect, a control information transmission method is provided. The control information transmission method is applied to a base station or a chip in a base station. Specifically, the control information transmission method provided in this embodiment of this application is: sending, by a base station, first indication information to user equipment UE, where the first indication information indicate a first time window in which the UE skips monitoring a physical downlink control channel PDCCH. For technical effects implemented by the control information transmission method provided in the ninth aspect, refer to the control information transmission methods provided in the first aspect, the third aspect, and the fifth aspect. Details are not described herein again.

Optionally, the first indication information includes at least one of the following: duration of the first time window; or a start location of the first time window.

Optionally, the method further includes: sending, by the base station, second indication information to the UE, where the second indication information indicate a second time window; and determining, by the base station based on the first time window and the second time window, a third time window in which the UE skips monitoring the physical downlink control channel PDCCH.

Optionally, the first time window does not overlap the second time window, or the first time window overlaps the second time window.

Optionally, when the first time window does not overlap the second time window, the determining, by the base station based on the first time window and the second time window, a third time window in which the UE skips monitoring the physical downlink control channel PDCCH includes: determining, by the base station based on the first time window and the second time window, that the third time window in which the UE skips monitoring the physical downlink control channel PDCCH is the first time window and the second time window, or determining that the third time window in which the UE skips monitoring the physical downlink control channel PDCCH is the first time window or the second time window.

Optionally, when the first time window overlaps the second time window, the determining, by the base station based on the first time window and the second time window, a third time window in which the UE skips monitoring the physical downlink control channel PDCCH includes: if the second time window includes the first time window, or the first time window includes the second time window, determining that the third time window in which the UE skips monitoring the physical downlink control channel PDCCH is the second time window, or determining that the third time window in which the UE skips monitoring the physical downlink control channel PDCCH is the first time window; or if a start location of the first time window is before a start location of the second time window, and an end location of the first time window is between the start location and an end location of the second time window, determining that the third time window in which the UE skips monitoring the physical downlink control channel PDCCH is from the start location of the first time window to the end location of the second time window, or determining that the third time window in which the UE skips monitoring the physical downlink control channel PDCCH is the first time window or the second time window.

Optionally, the first indication information and/or the second indication information is sent by using downlink control information DCI. For example, the DCI is group common signaling.

Optionally, the method further includes: receiving, by the base station, a scheduling request sent by the UE. The base station determines, based on the first indication information and the scheduling request, a time window in which the UE skips monitoring the physical downlink control channel PDCCH.

According to a tenth aspect, a control information transmission apparatus is provided. The control information transmission apparatus is a base station or a chip in a base station. Specifically, the control information transmission apparatus includes a sending unit. Functions implemented by the units and modules provided in this application are specifically as follows: The sending unit is configured to send first indication information to user equipment UE, where the first indication information indicate a first time window in which the UE skips monitoring a physical downlink control channel PDCCH.

Optionally, the first indication information includes at least one of the following: duration of the first time window; or a start location of the first time window.

Optionally, the sending unit is further configured to send second indication information to the UE, where the second indication information indicate a second time window. The processing unit is configured to determine, based on the first time window and the second time window, a third time window in which the UE skips monitoring the physical downlink control channel PDCCH.

Optionally, the first time window does not overlap the second time window, or the first time window overlaps the second time window.

Optionally, when the first time window does not overlap the second time window, the processing unit is specifically configured to: determine, based on the first time window and the second time window, that the third time window in which the UE skips monitoring the physical downlink control channel PDCCH is the first time window and the second time window; or determine that the third time window in which the UE skips monitoring the physical downlink control channel PDCCH is the first time window or the second time window.

Optionally, when the first time window overlaps the second time window, the processing unit is specifically configured to: if the second time window includes the first time window, or the first time window includes the second time window, determine that the third time window in which the UE skips monitoring the physical downlink control channel PDCCH is the second time window, or determine that the third time window in which the UE skips monitoring the physical downlink control channel PDCCH is the first time window.

Alternatively, the processing unit is specifically configured to: if a start location of the first time window is before a start location of the second time window, and an end location of the first time window is between the start location and an end location of the second time window, determine that the third time window in which the UE skips monitoring the physical downlink control channel PDCCH is from the start location of the first time window to the end location of the second time window, or determine that the third time window in which the UE skips monitoring the physical downlink control channel PDCCH is the first time window or the second time window.

Optionally, the first indication information and/or the second indication information is sent by using downlink control information DCI Optionally, the control information transmission apparatus further includes: a receiving unit, configured to receive a scheduling request sent by the UE. The processing unit is further configured to determine, based on the first indication information and the scheduling request that is received by the receiving unit, a time window in which the UE skips monitoring the physical downlink control channel PDCCH.

According to an eleventh aspect, a control information transmission method is provided. The control information transmission method is applied to a base station or a chip in a base station. Specifically, the control information transmission method provided in this embodiment of this application is: sending, by the base station, first indication information to user equipment UE, where the first indication information indicate a search space set in which the UE skips monitoring a PDCCH. For technical effects implemented by the control information transmission method provided in the eleventh aspect, refer to the control information transmission method provided in the seventh aspect. Details are not described herein again.

Optionally, the base station sends configuration information to the UE, or the base station preconfigures the configuration information, where the configuration information includes at least one group identifier, and each group identifier corresponds to a group of search space sets; and the first indication information includes the at least one group identifier, and the first indication information indicates the UE to skip monitoring the PDCCH in the search space sets that correspond to the group identifier and that are indicated by the first indication information.

Optionally, the first indication information is sent by using downlink control information DC. For example, the DCI is group common signaling.

According to a twelfth aspect, a control information transmission apparatus is provided. The control information transmission apparatus is a base station or a chip in a base station. Specifically, the control information transmission apparatus includes a sending unit. Functions implemented by the units and modules provided in this application are specifically as follows: The sending unit is configured to send first indication information to user equipment UE, where the first indication information indicate a search space set in which the UE skips monitoring a PDCCH.

Optionally, the control information transmission apparatus further includes: a configuration unit, configured to send configuration information to the UE, or preconfigure, by the base station, the configuration information, where the configuration information includes at least one group identifier, and each group identifier corresponds to a group of search space sets; and the first indication information includes the at least one group identifier, and the first indication information indicates the UE to skip monitoring the PDCCH in the search space sets that correspond to each group identifier and that are included in the first indication information.

Optionally, the first indication information is sent by using downlink control information DCI. For example, the DCI is group common signaling.

According to a thirteenth aspect, a control information transmission apparatus is provided. The control information transmission apparatus includes one or more processors and a communications interface. The communications interface is coupled to one or more processors. The control information transmission apparatus communicates with another device by using the communications interface. The processor is configured to execute computer program code in a memory, and the computer program code includes an instruction, so that the control information transmission apparatus performs the control information transmission method according to any one of the first, third, fifth, seventh, ninth, and eleventh aspects and the possible implementations thereof.

According to a fourteenth aspect, a computer-readable storage medium is further provided. The computer-readable storage medium stores an instruction; and when the instruction is run on the control information transmission apparatus, the control information transmission apparatus is enabled to perform the control information transmission method according to any one of the first, third, fifth, seventh, ninth, and eleventh aspects, and the possible implementations thereof.

According to a fifteenth aspect, a computer program product including an instruction is further provided. When the computer program product runs on a control information transmission apparatus, the control information transmission apparatus is enabled to perform the control information transmission method according to any one of the first, third, fifth, seventh, ninth, and eleventh aspects, and the possible implementations thereof.

According to a sixteenth aspect, an embodiment of this application further provides a chip system. The chip system includes a processor, configured to support a control information transmission apparatus in implementing the foregoing control information transmission methods. In a possible design, the chip system further includes a memory. The memory is configured to store a program instruction and data of the control information transmission apparatus. Certainly, the memory may alternatively not exist in the chip system. The chip system may include a chip, or may include a chip and another discrete device. This is not specifically limited in this embodiment of this application.

According to a seventeenth aspect, a communications system is provided. The communications system includes UE and a base station. The UE includes any control information transmission apparatus according to the second aspect, the fourth aspect, the sixth aspect, or the eighth aspect. The base station includes any control information transmission apparatus according to the tenth aspect or the twelfth aspect.

In this application, a name of the foregoing control information transmission apparatus does not constitute a limitation on devices or function modules. In actual implementation, the devices or function modules can have other names. Provided that functions of the devices or function modules are similar to those in this application, the devices or function modules fall within the scope of the claims in this application and their equivalent technologies.

For specific descriptions of the thirteenth aspect, the fourteenth aspect, the fifteenth aspect, the sixteenth aspect, the seventeenth aspect, and various implementations thereof in this application, refer to detailed descriptions of the first aspect to the twelfth aspect and various implementations thereof. In addition, for beneficial effects of the thirteenth aspect, the fourteenth aspect, the fifteenth aspect, and various implementations thereof, refer to beneficial effect analysis in the first aspect to the twelfth aspect and various implementations thereof. Details are not described herein again.

These aspects or other aspects in this application are more concise and comprehensible in the following descriptions.

BRIEF DESCRIPTION OF DRAWINGS

To describe the technical solutions in the embodiments of the present invention or in the prior art more clearly, the following briefly describes the accompanying drawings for describing the embodiments.

DESCRIPTION OF EMBODIMENTS

The following clearly and completely describes the technical solutions in embodiments of the present invention with reference to the accompanying drawings in the embodiments of this application.

In descriptions of this application, "/" means "or" unless otherwise specified. For example, A/B may represent A or B. In this specification, "and/or" describes only an association relationship for describing associated objects and represents that three relationships may exist. For example. A and/or B may represent the following three cases: Only A exists, both A and B exist, and only B exists. In addition, in the descriptions of this application, "a plurality of" means two or more than two. In addition, to clearly describe the technical solutions in the embodiments of this application, "first", "second", and the like in the embodiments of this application are used to distinguish between different objects, or are used to distinguish between different processing on a same object, but are not used to describe a specific order of the objects.

Figure 1:
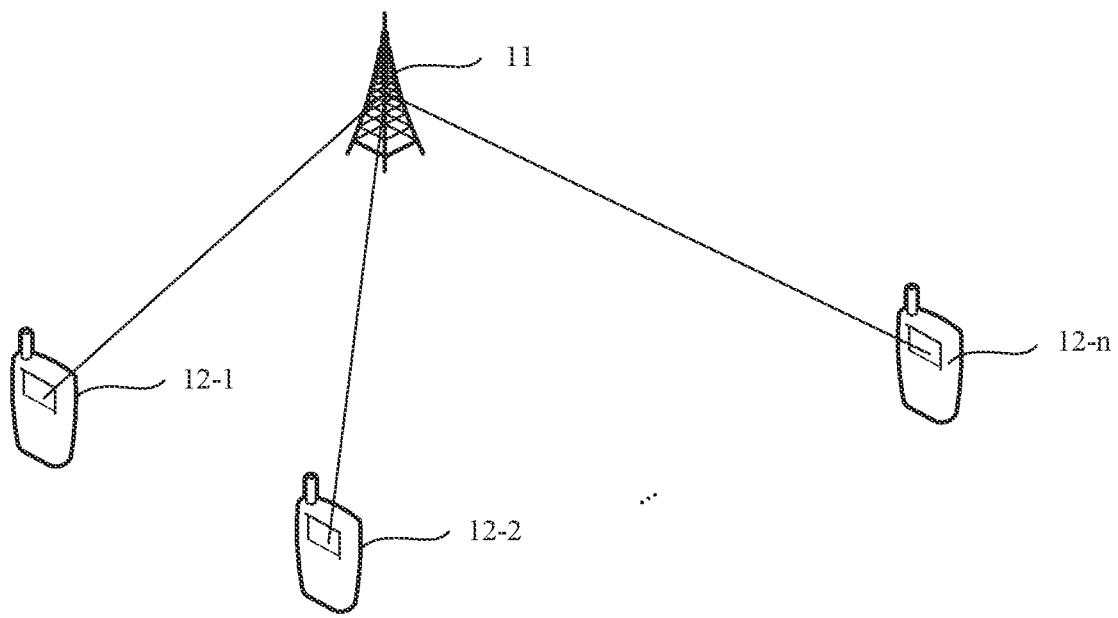
FIG. 1 is a schematic diagram of a communications system according to an embodiment of this application.
Figure 2:
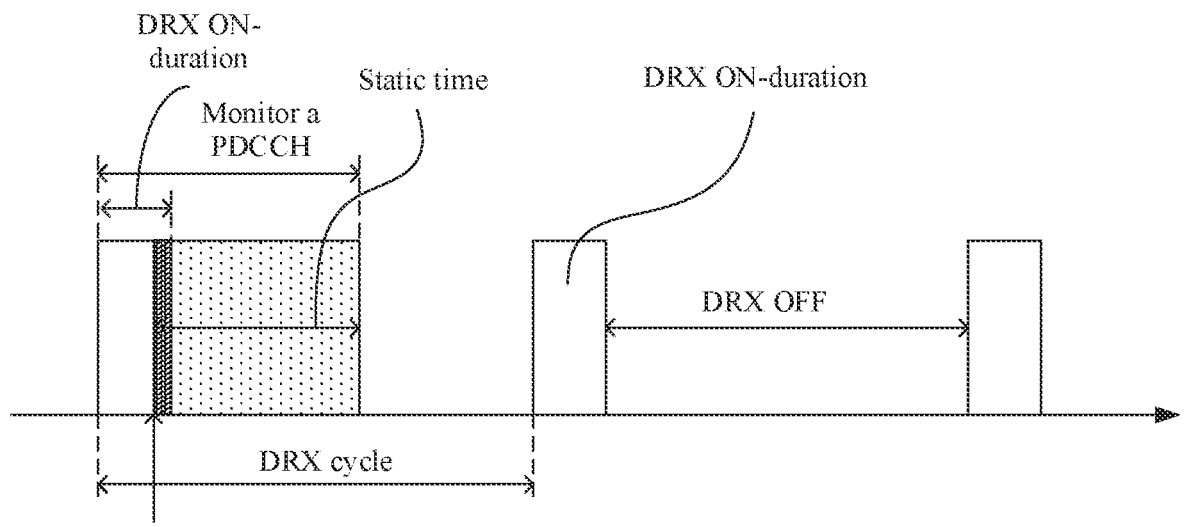
FIG. 2 is a schematic diagram of a search space set according to an embodiment of this application.

The embodiments of this application are applied to a communications system shown in FIG. 1, and the communications system includes a base station and UEs, for example, a base station 11 and UEs 12 (12-1, 12-2, ..., 12-n). When the base station needs to send data, the base station first needs to send scheduling information to the UE. A specific process is as follows: The base station configures a CORESET and a search space set by using RRC signaling to send a PDCCH, where the PDCCH is used to carry scheduling information of data the UE monitors the PDCCH at locations indicated by the CORESET and the search space set, to obtain the scheduling information; and if the PDCCH has the scheduling information, the UE receives, based on the scheduling information, the data sent by using the PDSCH. The CORESET represents a time-frequency resource set that is used to carry a PDCCH, and a group of PDCCH candidates (candidate) monitored by the UE are defined as a search space set of the PDCCH. The search space set may be a common search space set (common search space set) or a UE-specific search space set (UE-specific search space set). Based on configurations configured by the base station, the UE may monitor the PDCCH in one or more search space sets. In the version of 3GPP Release 15, for each downlink bandwidth part (bandwidth part, BWP) of a serving cell, a maximum of 10 search space sets may be configured for the UE by using RRC signaling, and configurations of each search space set include: an index of the search space set a CORESET associated with the search space set; a PDCCH monitoring periodicity and a PDCCH monitoring offset; a PDCCH monitoring pattern in a slot; duration of the search space set, indicating a quantity of slots of the search space set; PDCCH candidates at each aggregation level; a search space set type indicator, indicating a common search space set or a UE-specific search space set; and a DCI format (format) of the common search space set or the UE-specific search space set. However, in many cases, the base station does not continuously have data to send to the UE, but the UE still needs to monitor the PDCCH at the locations indicated by the CORESET and the search space set and does not schedule data. This case is referred to as PDCCH-only. PDCCH-only consumes a large amount of power. In this case, a power saving (power saving) mechanism is introduced to NR, and when there is no data transmission, the UE enters a power saving mode. For example, in a solution, long term evolution (long term evolution, LTE) and NR support a discontinuous reception (discontinuous reception, DRX) mechanism. This can reduce power consumption of the UE. As shown in FIG. 2, in a connected mode DRX (connected mode DRX, C-DRX) working mode, the UE periodically enables a receiver to monitor the PDCCH. The base station semi-statically configures parameters such as a DRX cycle (DRX cycle, or monitoring periodicity), DRX-on duration (ON-duration), and an inactivity time (inactivity time) for the UE. The UE enables the receiver in the ON-duration and inactivity time phases to monitor the PDCCH. A process is as follows: When DRX is configured, the UE periodically monitors the PDCCH in the ON-duration phase. If the UE detects the PDCCH through monitoring, the UE sends/receives data based on received scheduling information, and the base station activates an inactivity time. The UE continues to monitor the PDCCH in the inactivity time until the inactivity time expires, and the UE enters a DRX OFF (where DRX is disabled) phase in which the UE does not need to monitor the PDCCH. If the UE does not detect the PDCCH through monitoring in the ON-duration phase, the UE directly enters the DRX OFF phase. In the DRX mechanism, a phase in which the UE needs to monitor the PDCCH is referred to as an active time (active time). However, because DRX is semi-static and periodic and cannot be adjusted in time based on a service arrival status, power consumption requirements of the UE in NR cannot be well satisfied. For example, in FIG. 2, in ON-duration of a second periodicity, although the PDCCH has no scheduling information in the active time, the UE still needs to enable the receiver to monitor the PDCCH. This leads to a waste of power consumption of the UE. In the DRX mechanism, a phase in which the UE needs to monitor the PDCCH is referred to as an active time (active time).

For the foregoing problem, the embodiments of this application provide a control information transmission method: User equipment UE receives first indication information that is sent by a base station and that indicate a first time window; and the UE skips monitoring a physical downlink control channel PDCCH in the first time window. In this way, the UE skips monitoring the PDCCH in the first time window as indicated by the base station, thereby reducing power consumption of the UE. For example, when the base station has no data to transmit to the UE, the base station does not need to send scheduling information to the UE by using the PDCCH in a following time. In this way, the base station directly indicates the UE to skip monitoring the PDCCH in the following time. Compared with the prior art in which the PDCCH is periodically monitored, in the method provided in the embodiments of this application, the base station may actively trigger, in real time, the UE to stop monitoring the PDCCH, thereby reducing the power consumption of the UE. The embodiments of this application may be further used for the active time in the DRX mode, to further reduce the power consumption of the UE.

The UE in the embodiments of this application may be a mobile phone (for example, a mobile phone 300 shown in FIG. 3), a tablet computer, a personal computer PC, a personal digital assistant PDA, a smartwatch, a netbook, a wearable electronic device, or the like that can implement information exchange with the base station. A specific form of the device is not specially limited in the embodiments of this application. The base station shown in FIG. 1 may be configured to communicate with one or more user equipments, or may be configured to communicate with one or more base stations having some user equipment functions (for example, communication between a macro base station and a micro base station, such as an access point). The base station may also be referred to as an access point, a node, a NodeB, an evolved NodeB (eNB), or another network entity, and may include some or all functions of the foregoing network entity. In systems using different radio access technologies, names of the base station may be different. For example, in an LTE network (or referred to as a 4G system), a name of the base station is an evolved NodeB (evolved NodeB, eNB or eNodeB); in a 3G system, a name of the base station is a NodeB (Node B); in a next-generation radio communications system (for example, a 5G system), a name of the base station is a DgNB. With evolution of communications technologies, the name of the base station may change. In addition, in another possible case, the base station may be another apparatus that provides a wireless communication function for a terminal device.

Figure 3:
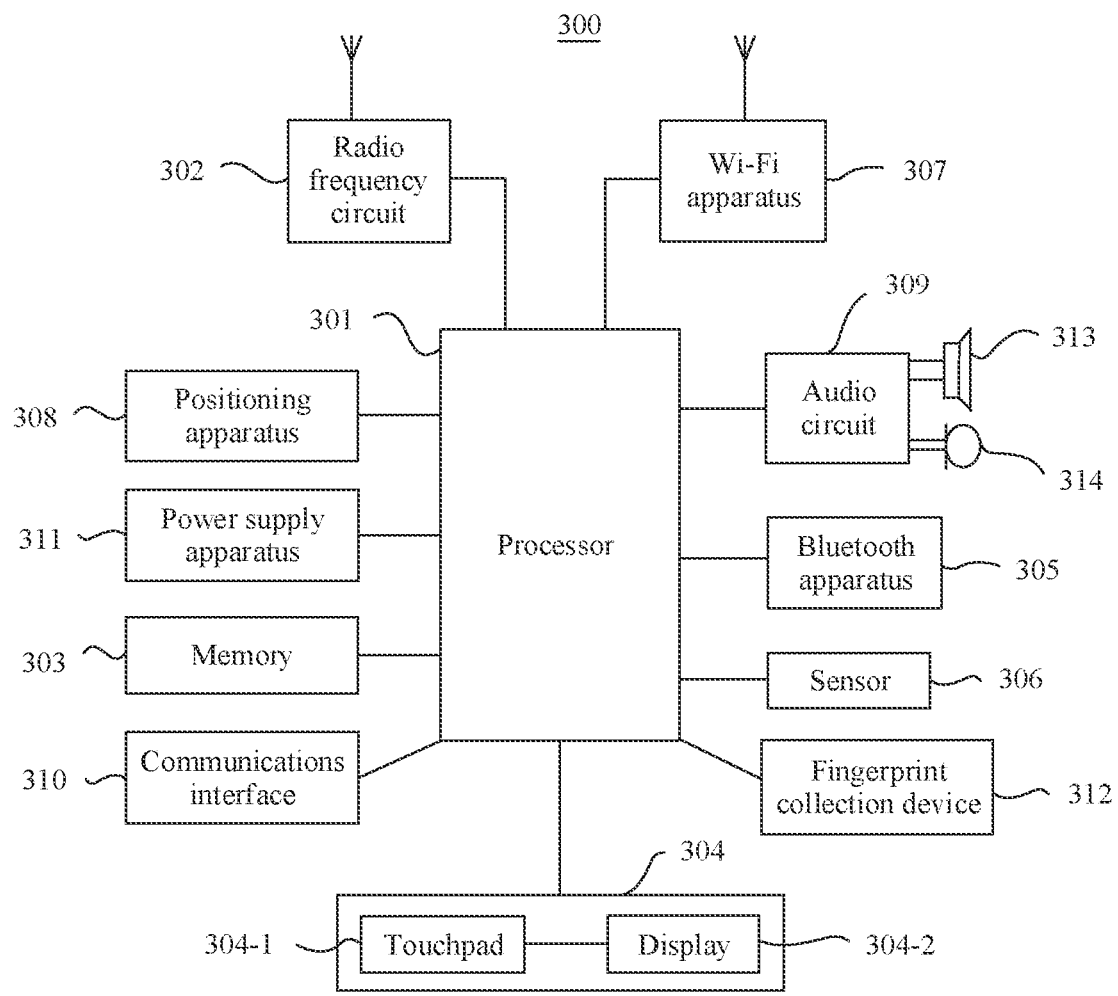
FIG. 3 is a schematic structural diagram of UE according to an embodiment of this application.

As shown in FIG. 3, the mobile phone 300 is used as an example of the foregoing UE. The mobile phone 300 may specifically include components such as a processor 301, a radio frequency circuit 302, a memory 303, a touchscreen 304, a Bluetooth apparatus 305, one or more sensors 306, a Wi-Fi apparatus 307, a positioning apparatus 308, an audio circuit 309, a communications interface 310, and a power supply apparatus 311. These components may communicate by using one or more communications buses or signal cables (not shown in FIG. 3). A person skilled in the art may understand that a hardware structure shown in FIG. 3 does not constitute a limitation on the mobile phone, and the mobile phone 300 may include more or fewer components than those shown in the figure, or some components may be combined, or different component arrangements may be used.

The following describes in detail the components of the mobile phone 300 with reference to FIG. 3.

The processor 301 is a control center of the mobile phone 300, is connected to all parts of the mobile phone 300 via various interfaces and lines, and performs various functions of the mobile phone 300 and processes data by running or executing an application program stored in the memory 303 and invoking data stored in the memory 303. In some embodiments, the processor 301 may include one or more processing units. In some embodiments of this application, the processor 301 may further include a fingerprint verification chip, configured to verify a collected fingerprint.

The radio frequency circuit 302 may be configured to receive/send a radio signal in an information receiving/sending process or a call process. Particularly, after receiving downlink data from a base station, the radio frequency circuit 302 may send the downlink data to the processor 301 for processing, and sends related uplink data to the base station. Generally, the radio frequency circuit includes but is not limited to an antenna, at least one amplifier, a transceiver, a coupler, a low noise amplifier, a duplexer, and the like. In addition, the radio frequency circuit 302 may further communicate with another device through wireless communication. The wireless communication may use any communications standard or communication protocol, including but not limited to global system for mobile communications, general packet radio service, code division multiple access, wideband code division multiple access, long term evolution, email, short message service, and the like.

The memory 303 is configured to store the application program and the data. The processor 301 performs various functions of the mobile phone 300 and processes data by running the application program and the data that are stored in the memory 303. The memory 303 mainly includes a program storage area and a data storage area. The program storage area may store an operating system, and an application program used for at least one function (for example, a sound playback function or an image processing function). The data storage area may store data (for example, audio data or a phone book) created based on use of the mobile phone 300. In addition, the memory 303 may include a high-speed random access memory (RAM), and may further include a non-volatile memory such as a magnetic disk storage device, a flash memory, another volatile solid-state storage component, or the like. The memory 303 may store various operating systems such as an iOS operating system and an Android operating system. The memory 303 may be independent, and is connected to the processor 301 via the communications bus; or the memory 303 may be integrated with the processor 301.

The touchscreen 304 may specifically include a touchpad 304-1 and a display 304-2.

The touchpad 304-1 may collect a touch event (for example, an operation performed by a user of the mobile phone 300 on the touchpad 304-1 or near the touchpad 304-1 by using any proper object such as a finger or a stylus) performed by the user on or near the touchpad 304-1, and send collected touch information to another device (for example, the processor 301). The touch event performed by the user near the touchpad 304-1 may be referred to as a floating touch. The floating touch may mean that the user does not need to directly touch the touchpad to select, move, or drag an object (for example, an icon), and the user only needs to be near a device to perform a desired function. In addition, the touchpad 304-1 may be implemented in a plurality of types such as a resistive type, a capacitive type, an infrared type, and a surface acoustic wave type.

The display (also referred to as a display screen) 304-2 may be configured to display information entered by the user or information provided for the user, and various menus of the mobile phone 300. The display 304-2 may be configured in a form such as a liquid crystal display or an organic light-emitting diode. The touchpad 304-1 may cover the display 304-2. When detecting a touch event on or near the touchpad 304-1, the touchpad 304-1 transfers the touch event to the processor 301 to determine a type of the touch event. Then, the processor 301 can provide a corresponding visual output on the display 304-2 based on the type of the touch event. In FIG. 3, the touchpad 304-1 and the display 304-2 act as two independent components to implement input and output functions of the mobile phone 300. However, in some embodiments, the touchpad 304-1 and the display screen 304-2 may be integrated to implement the input and output functions of the mobile phone 300. It may be understood that the touchscreen 304 is formed by stacking a plurality of layers of materials. In this embodiment of this application, only the touchpad (layer) and the display screen (layer) are displayed, and another layer is not recorded in this embodiment of this application. In addition, the touchpad 304-1 may be disposed on a front side of the mobile phone 300 in a form of a full panel, and the display screen 304-2 may also be disposed on the front side of the mobile phone 300 in a form of a full panel. Therefore, a frameless structure can be implemented for the front side of the mobile phone.

In addition, the mobile phone 300 may further have a fingerprint recognition function. For example, a fingerprint collection device 312 may be disposed on a back side (for example, below a rear-facing camera) of the mobile phone 300, or may be disposed on the front side (for example, below the touchscreen 304) of the mobile phone 300. For another example, a fingerprint collection device 312 may be disposed on the touchscreen 304 to implement a fingerprint recognition function. In other words, the fingerprint collection device 312 may be integrated with the touchscreen 304 to implement the fingerprint recognition function of the mobile phone 300. In this case, the fingerprint collection device 312 is disposed on the touchscreen 304, and may be a part of the touchscreen 304, or may be disposed on the touchscreen 304 in another manner. In this embodiment of this application, a main component of the fingerprint collection device 312 is a fingerprint sensor. Any type of sensing technology may be used for the fingerprint sensor, including but not limited to an optical sensing technology, a capacitive sensing technology, a piezoelectric sensing technology, an ultrasonic sensing technology, or the like.

The mobile phone 300 may further include the Bluetooth apparatus 305, configured to implement data exchange between the mobile phone 300 and another device (for example, a mobile phone or a smartwatch) in a short distance. In this embodiment of this application, the Bluetooth apparatus may be an integrated circuit, a Bluetooth chip, or the like.

The mobile phone 300 may further include at least one type of sensor 306, such as a light sensor, a motion sensor, and another sensor. Specifically, the light sensor may include an ambient light sensor and a proximity sensor. The ambient light sensor may adjust luminance of the display of the touchscreen 304 based on intensity of ambient light. The proximity sensor may power off the display when the mobile phone 300 is moved to an ear. As one type of the motion sensor, an accelerometer sensor may detect a value of acceleration in each direction (usually on three axes). The accelerometer sensor may detect a value and a direction of gravity when the accelerometer sensor is stationary, and may be applied to an application for identifying a mobile phone posture (such as screen switching between a landscape mode and a portrait mode, a related game, or magnetometer posture calibration), a function related to vibration recognition (such as a pedometer or a knock), and the like. For another sensor such as a gyroscope, a barometer, a hygrometer, a thermometer, or an infrared sensor that may be further disposed in the mobile phone 300, details are not described herein.

The Wi-Fi apparatus 307 is configured to provide, for the mobile phone 300, network access that complies with a Wi-Fi-related standard protocol. The mobile phone 300 may access a Wi-Fi access point via the Wi-Fi apparatus 307, to help the user to receive and send an email, browse a web page, access streaming media, and the like. The Wi-Fi apparatus 307 provides wireless broadband internet access for the user. In some other embodiments, the Wi-Fi apparatus 307 may also be used as a Wi-Fi wireless access point, and may provide Wi-Fi network access for another device.

The positioning apparatus 308 is configured to provide a geographical location for the mobile phone 300. It can be understood that the positioning apparatus 308 may be specifically a receiver of a positioning system such as a global positioning system (global positioning system, GPS), a Beidou satellite navigation system, or a Russian GLONASS. After receiving a geographic location sent by the foregoing positioning system, the positioning apparatus 308 sends the information to the processor 301 for processing, or sends the information to the memory 303 for storage. In some other embodiments, the positioning apparatus 308 may be alternatively a receiver of an assisted global positioning system AGPS. The AGPS system serves as an assisted server to assist the positioning apparatus 308 in completing ranging and positioning services. In this case, the assisted positioning server communicates with a device, such as the positioning apparatus 308 (namely, the GPS receiver) of the mobile phone 300, through a wireless communications network, to provide positioning assistance. In some other embodiments, the positioning apparatus 308 may alternatively use a positioning technology based on a Wi-Fi access point. Each Wi-Fi access point has a globally unique MAC address, and a device may scan and collect a broadcast signal of a surrounding Wi-Fi access point when Wi-Fi is enabled. Therefore, the device may obtain a MAC address broadcast by the Wi-Fi access point. The device sends such data (for example, the MAC address) that can identify the Wi-Fi access point to a location server through the wireless communications network. The location server retrieves a geographical location of each Wi-Fi access point, calculates a geographical location of the device with reference to strength of the Wi-Fi broadcast signal, and sends the geographical location of the device to the positioning apparatus 308 of the device.

The audio circuit 309, a loudspeaker 313, and a microphone 314 may provide an audio interface between the user and the mobile phone 300. The audio circuit 309 may convert received audio data into an electrical signal and transmit the electrical signal to the speaker 313, and the speaker 313 converts the electrical signal into a sound signal for output. In addition, the microphone 314 converts a collected sound signal into an electrical signal, and the audio circuit 309 receives the electrical signal, converts the electrical signal into audio data, and then outputs the audio data to the radio frequency circuit 302, to send the audio data to, for example, another mobile phone, or outputs the audio data to the memory 303 for further processing.

The communications interface 310 is configured to provide various interfaces for an extremal input/output device (such as a keyboard, a mouse, an external display, an external memory, or a subscriber identity module card). For example, the peripheral interface 310 is connected to the mouse through a universal serial bus USB interface, and the peripheral interface 310 is connected, by using a metal contact on a card slot of the subscriber identification module card, to the subscriber identification module SIM card provided by a telecommunications operator. The communications interface 310 may be configured to couple the external input/output peripheral device to the processor 301 and the memory 303.

In this embodiment of this application, the mobile phone 300 may communicate with another device in a device group through the communications interface 310. For example, the mobile phone 300 may receive, through the communications interface 310, display data sent by the another device for display. This is not limited in this embodiment of this application.

The mobile phone 300 may further include the power apparatus 311 (for example, a battery and a power management chip) that supplies power to the components. The battery may be logically connected to the processor 301 via the power management chip, so that the power apparatus 311 implements functions such as charging and discharging management and power consumption management.

Although not shown in FIG. 3, the mobile phone 300 may further include a camera (a front-facing camera and/or a rear-facing camera), a camera flash, a micro projection apparatus, a near field communication NFC apparatus, and the like. Details are not described herein.

Figure 4:
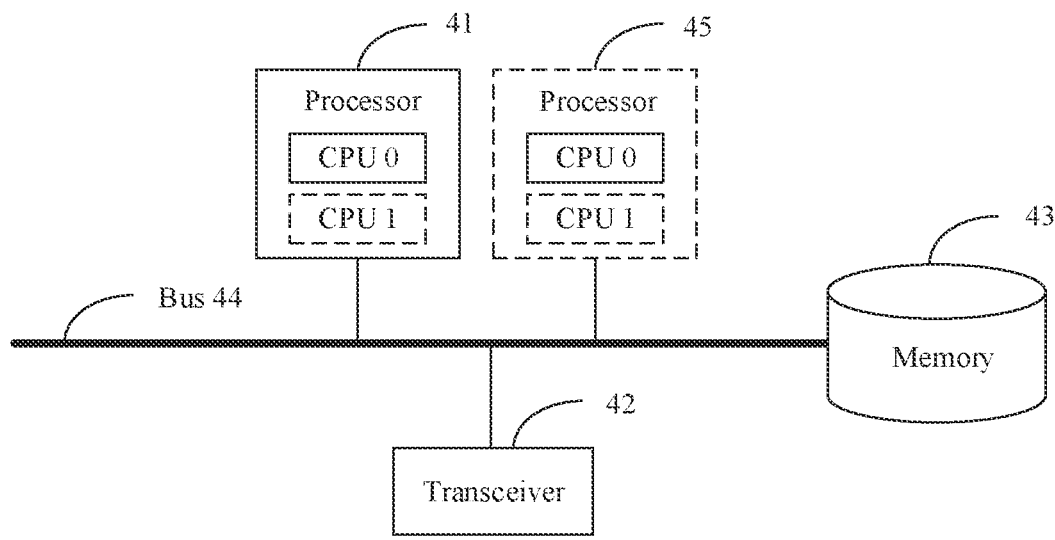
FIG. 4 is a schematic structural diagram of a base station according to an embodiment of this application.

FIG. 4 is a schematic composition diagram of a base station according to an embodiment of this application. As shown in FIG. 4, the base station may include at least one processor 41 and a transceiver 42.

The components of the base station are described in detail below with reference to FIG. 4.

The processor 41 is a control center of the base station, and may be one processor, or may be a general term of a plurality of processing elements. For example, the processor 41 is a CPU, may be an application-specific integrated circuit ASIC, or may be one or more integrated circuits configured to implement the embodiments of this application, for example, one or more microprocessors DSPs or one or more field programmable gate arrays FPGAs. Certainly, the base station may further include a memory 43.

The processor 41 may independently perform the functions of the base station in this application, or may perform various functions of the base station by running or executing a software program stored in the memory 43 and invoking data stored in the memory 43.

In specific implementation, in an embodiment, the processor 41 may include one or more CPUs, for example, a CPU 0 and a CPU 1 shown in the figure.

In specific implementation, in an embodiment, the base station may include a plurality of processors such as a processor 41 and a processor 45 shown in FIG. 4. Each of the processors may be a single-core processor (single-CPU) or may be a multi-core processor (multi-CPU). The processor herein may refer to one or more devices, circuits, and/or processing cores configured to process data (for example, a computer program instruction).

The memory 43 may be a read-only memory ROM or another type of static storage device that can store static information and an instruction, a random access memory RAM or another type of dynamic storage device that can store information and an instruction, or may be an electrically erasable programmable read-only memory EEPROM, a compact disc read-only memory CD-ROM or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer. However, the memory 43 is not limited thereto. The memory 43 may exist independently, and is connected to the processor 41 through a bus 44. The memory 43 may alternatively be integrated with the processor 41.

The memory 43 is configured to store a software program for performing the solutions of this application, and the processor 41 controls the execution.

The transceiver 42 is configured to communicate with another device or a communications network, for example, configured to communication with Ethernet, a radio access network RAN, and a wireless local area network WLAN. The transceiver 42 may include all or a part of a baseband processor, and may further optionally include an RF processor. The RF processor is configured to send or receive an RF signal. The baseband processor is configured to process a baseband signal converted from the RF signal or a baseband signal to be converted into the RF signal.

The bus 44 may be an industry standard architecture ISA bus, a peripheral component interconnect PCI bus, an extended industry standard architecture EISA bus, or the like. The bus may be classified into an address bus, a data bus, a control bus, and the like. For ease of representation, only one thick line is used to represent the bus in FIG. 4, but this does not mean that there is only one bus or only one type of bus.

The device structure shown in FIG. 4 does not constitute a limitation on the base station. The base station may include more or fewer components than those shown in the figure, or some components may be combined, or different component arrangements may be used.

Figure 5:
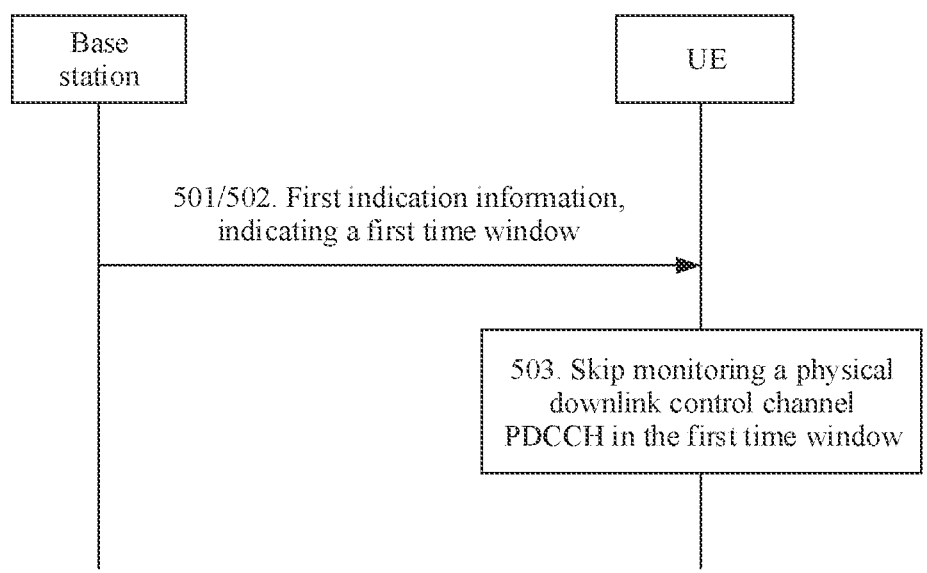
FIG. 5 is a schematic diagram of signaling interaction of a control information transmission method according to an embodiment of this application.

Based on the foregoing network system and hardware, an embodiment of this application provides a control information transmission method. The control information transmission method is applied to user equipment UE or a chip in UE. Referring to FIG. 5, the method includes the following steps.

501. A base station sends first indication information to user equipment UE.

The first indication information indicate a first time window in which the UE skips monitoring a physical downlink control channel PDCCH.

502. The user equipment UE receives the first indication information sent by the base station.

To indicate the first time window to the UE by using the first indication information, the first indication information includes at least one of the following: duration of the first time window; or a start location of the first time window. The first indication information may be referred to as a go-to-sleep signal (sleep signaling) or a power saving signal (power saving signaling), and indicate the UE to skip monitoring the PDCCH in the following first time window.

When the first indication information includes the duration of the first time window, the UE determines the first time window based on the default start location of the first time window and the duration of the first time window.

For example, the first time window may include at least one slot (slot), and the UE receives, in a first slot, the first indication information sent by the base station. The UE determines an $X^{th}$ slot after the first slot as a start slot of the first time window, and the UE determines the first time window based on the start slot and the duration of the first time window. A value of X may be configured by the base station, or may be statically defined in the UE.

In addition, if the base station sends scheduling information to the UE before sending the first indication information, before the UE receives the first indication information sent by the base station, the method further includes: receiving, by the UE, the scheduling information sent by the base station, where the scheduling information indicate information about a time domain for sending data by the base station to the UE. In this case, the UE determines a next slot of an end of a PDSCH transmission slot as the start slot of the first time window, and the UE determines the first time window based on the start slot and the duration of the first time window. The first indication information and the scheduling information may be separately sent, or may be carried in same DCI.

Specifically, the first indication information may be sent by using DCI. For example, the DCI may be group (group) common signaling or UE-level indication information.

For example, when the DCI is group common signaling, a format of the DCI is a window 1, a window 2, . . . , and a window N, where N≥1, and window i indicates duration that is of the first time window and that corresponds to $i^{th}$ UE, and a unit is a slot. Other time units may alternatively be used as time unit slots in all embodiments of the present invention. window i is represented by using x bits (where x is a positive integer), and different bit sequences correspond to different duration of the first time window. Refer to Table 1. In this case, a quantity of bits required by the DCI is N*x.

TABLE 1

| DCI (window i) | Duration of the first time window |
|---|---|
| 00 | 2 |
| 01 | 4 |
| 10 | 6 |
| 11 | 8 |

Certainly, only one type of duration of the first time window may be indicated in the DCI, indicating that all UEs in a group share one type of duration of the first window. In this case, a quantity of bits required by the DCI is x.

As described above, a manner of determining the start location of the first time window may be: determining an $X^{th}$ slot after a slot in which the first indication information is located as the start location of the first time window; or fixing a next slot of a slot in which a PDSCH indicated by received scheduling information is located, as the start location of the first time window.

Figure 6:
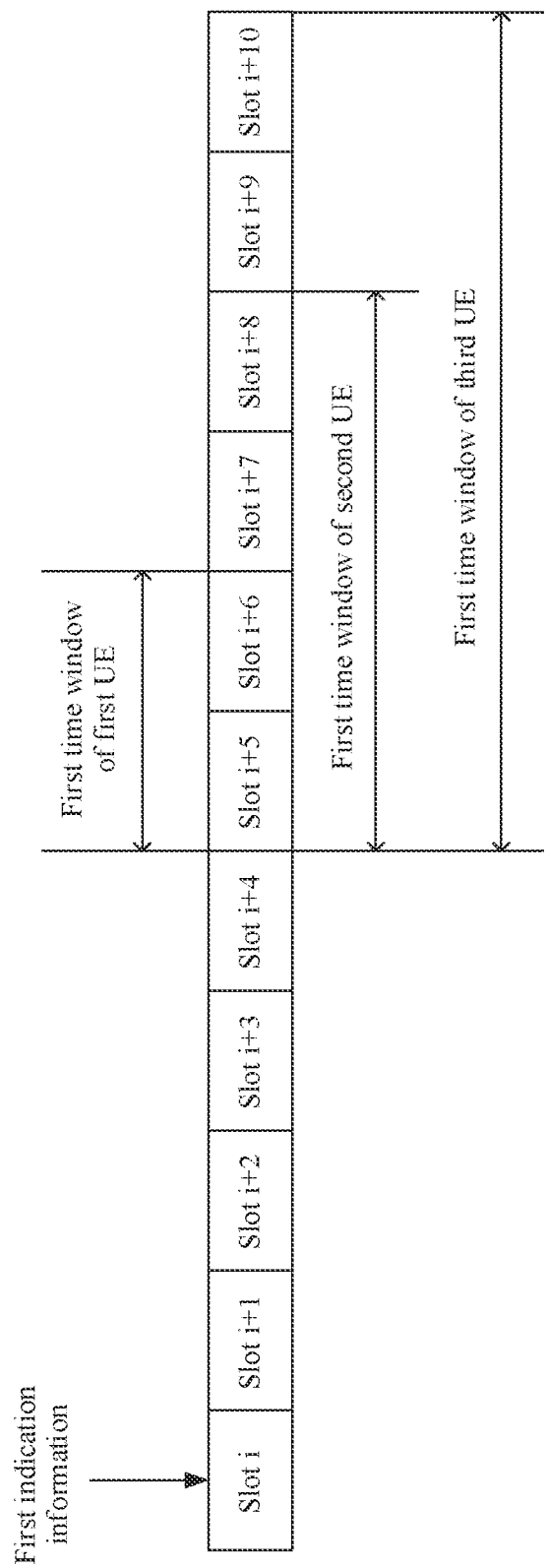
FIG. 6 is a schematic diagram 1 of a control information transmission method according to an embodiment of this application.

In a solution, referring to FIG. 6, if the base station sends the first indication information in a slot i, and does not send the scheduling information before the slot i, or transmission of a PDSCH indicated by the scheduling information ends, an $X^{th}$ slot after the slot i is fixed as the start location of the first time window, where X≥1. For example, if X=5, with reference to Table 1, it indicates that starting from a slot i+5, first UE skips monitoring the PDCCH in two slots (i+5 and i+6) following a slot i+4, second UE skips monitoring the PDCCH in four slots (i+5, i+6, i+7, and i+8) following the slot i+4, and third UE skips monitoring the PDCCH in six slots (i+5, i+6, i+7, i+8, i+9, and i+10) following the slot i+4.

When the first indication information includes the start location of the first time window, the UE determines the first time window based on predetermined window duration and the start location, where the predetermined window duration indicates the duration of the first time window. The predetermined window duration may be fixed duration, or any duration preconfigured by the base station. For example, when the DCI is group common signaling, a format of the DCI is a window 1, a window 2, . . . , and a window N, where N≥1, and window i indicates a start location of the first time window of $i_{th}$ UE. window i is represented by using x bits (where x is a positive integer), and different bit sequences correspond to different start locations of the first time window. Refer to Table 2.

TABLE 2

| DCI (window i) | Start location of the first time window |
|---|---|
| 00 | 4 |
| 01 | 5 |
| 10 | 6 |
| 11 | 7 |

Figure 7:
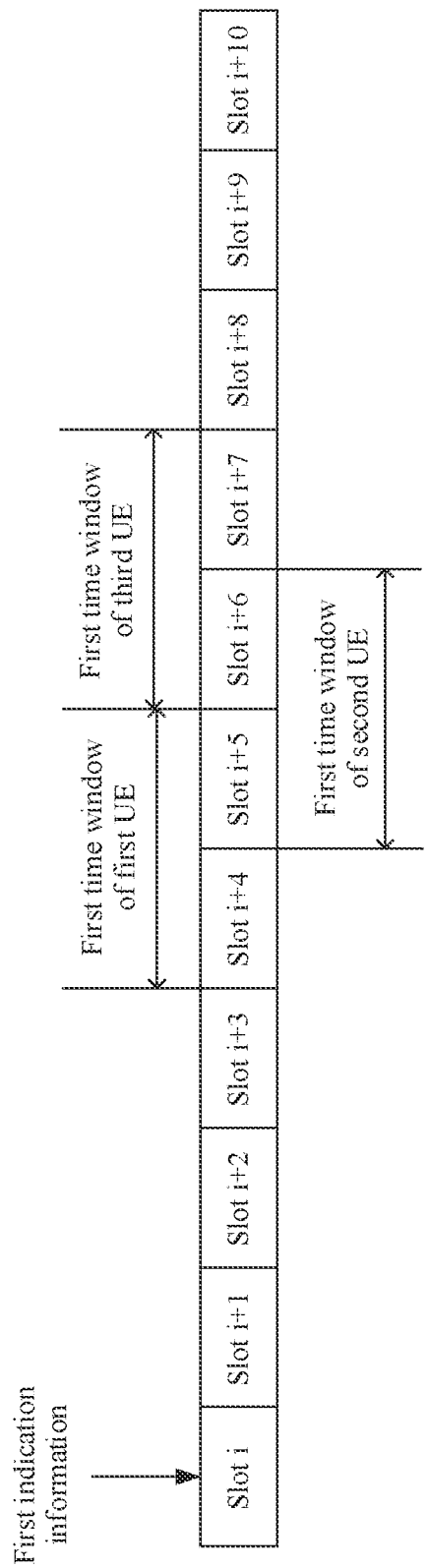
FIG. 7 is a schematic diagram 2 of a control information transmission method according to an embodiment of this application.

Referring to FIG. 7, for example, the base station sends the first indication information in a slot i. For example, when N=3, fields in DCI are 00, 01, and 10, indicating that starting from a slot i+4, first UE skips monitoring the PDCCH from the slot i+4, second UE skips monitoring the PDCCH from a slot i+5, and third UE skips monitoring the PDCCH from a slot i+6. The duration of the first time window may be two slots by default.

In addition, the first indication information may further include both the duration of the first time window and the start location of the first time window. For example, when the DCI is group common signaling, a format of the DCI is a window 1, a window 2, . . . , and a window N, where N≥1, and window i indicates duration and a start location of the first time window of $i^{th}$UE. window i is represented by using x bits (where x is a positive integer), and different bit sequences correspond to different duration and start locations of the first time window. Refer to Table 3. The base station sends the first indication information in a slot i. For example, when N=3, fields in DCI are 00, 01, and 10. It indicates that starting from a slot i+4, first UE skips monitoring the PDCCH in two consecutive slots (i+4 and i+5) from the slot i+4, second UE skips monitoring the PDCCH in four consecutive slots (i+5, i+6, i+7, and i+8) from the slot i+5, and third UE skips monitoring the PDCCH in six consecutive slots (i+6, i+7, i+8, i+9, i+10, and i+11) from the slot i+6.

TABLE 3

| DCI (window i) | Duration of the first time window | Start location of the first time window |
| --- | --- | --- |
| 00 | 2 | 4 |
| 01 | 4 | 5 |
| 10 | 6 | 6 |
| 11 | 8 | 7 |

Figure 8:
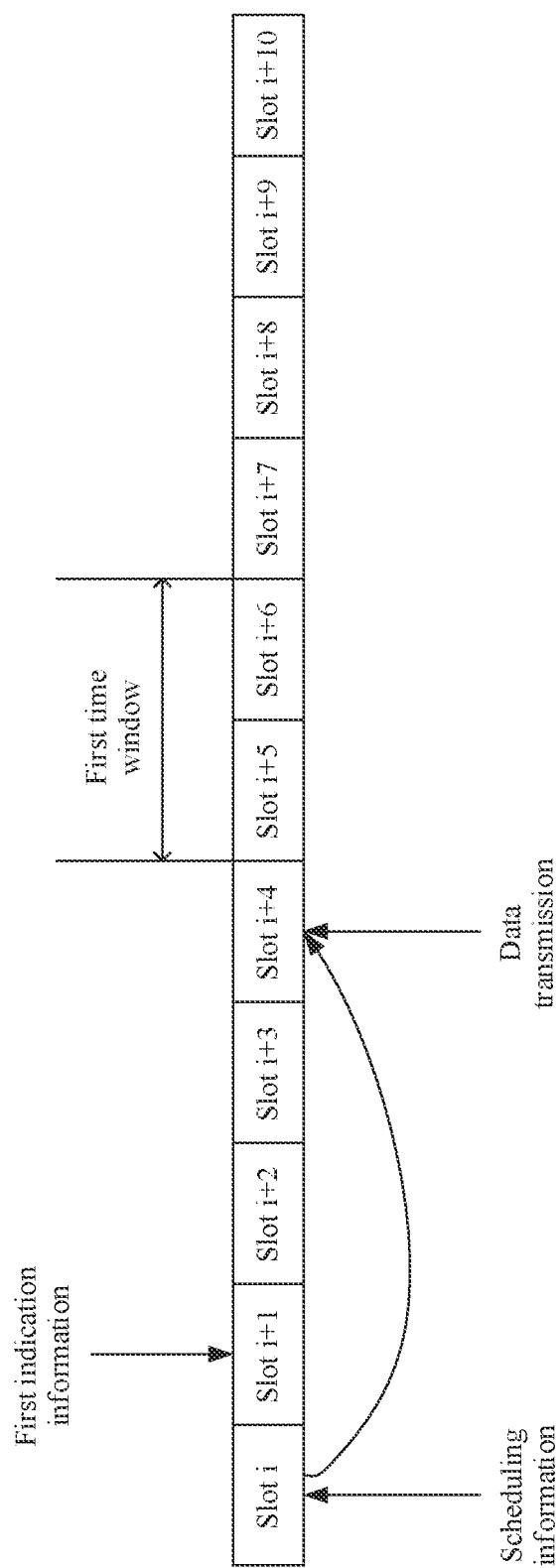
FIG. 8 is a schematic diagram 3 of a control information transmission method according to an embodiment of this application.

When the DCI is UE-level indication information, the first indication information is applicable to only one UE. In this case, the first indication information carries duration and/or a start location of a first time window of only one UE. A representation manner is similar to that of the duration of the first time window shown in Table 1. Different bit sequences may be used to correspondingly represent the duration or the start location of the first time window of the UE. It should be noted that, when the DCI is the UE-level indication information, the DCI is different from the DCI using the group common signaling, and the first indication information and the scheduling information may be separately sent, or may be carried in same DCI. When the first indication information and the scheduling information are separately sent, the first indication information may be carried in bits in a resource allocation field in the DCI. When the first indication information and the scheduling information are carried in same DCI, a size of the DCI remains unchanged, meanings of bits in a resource allocation field need to be re-interpreted, and the first indication information and the scheduling information are carried in the bits in the resource allocation field in the same DCI. Specifically, for example, when two frequency domain resource allocation manners are configured in the DCI, a value that is of a resource allocation field and that indicate a frequency domain resource allocation manner in the DCI is a larger value of resource allocation fields corresponding to the two frequency domain resource allocation manners. When a smaller value indicate frequency domain resource allocation, there may be some extra bits, and these bits may be used to carry the first indication information. Alternatively, the DCI is extended by a new bit field to carry the first indication information. For example, a new bit field is added to indicate the first indication information, and may indicate a valid time of the first indication information. The valid time is represented by using an offset, and the valid time is X slots after a slot at which transmission of the PDSCH corresponding to the scheduling information ends. Referring to FIG. 8, for example, the base station schedules a PDSCH in a slot i to transmit data in a slot i+4, and sends the first indication information in a slot i+1. In this case, the UE skips monitoring the PDCCH in fixed duration following the slot i+4. For example, the UE skips monitoring the PDCCH in (i+5 and i+6).

503. The UE skips monitoring the physical downlink control channel PDCCH in the first time window.

In this way, the UE skips monitoring the PDCCH in the first time window as indicated by the base station, thereby reducing power consumption of the UE. For example, when the base station has no data to transmit to the UE, the base station does not need to send scheduling information to the UE by using the PDCCH in a following time. In this way, the base station directly indicates the UE to skip monitoring the PDCCH in the following time. Compared with the prior art in which the PDCCH is periodically monitored, in the method provided in this embodiment of this application, the base station may actively trigger, in real time, the UE to skip monitoring the PDCCH, thereby reducing the power consumption of the UE.

Based on the solution provided in FIG. 5, the base station sends the first indication information to the UE, to indicate the UE to skip monitoring the PDCCH in the following first time window. However, due to a factor such as a change of a scheduling policy of the base station or a service requirement, the base station may need to re-indicate a time window in which the UE skips detecting the PDCCH. Therefore, in this application, a new piece of second indication information may be further sent to indicate a second time window. After the UE receives the first indication information, if the base station sends the second indication information, the UE then receives the second indication information. The time window in which the UE finally skips detecting the PDCCH depends on a relationship between the first time window corresponding to the first indication information and the second time window corresponding to the second indication information. Specifically, referring to FIG. 9, the method includes the following steps.

601. A base station sends first indication information to user equipment UE.

602. The user equipment UE receives the first indication information sent by the base station.

The first indication information indicate a first time window.

603. The base station sends second indication information to the UE.

604. The UE receives the second indication information sent by the base station.

The second indication information indicate a second time window.

The first indication information and/or the second indication information is sent by using downlink control information DCI. In addition, the DCI may be group common signaling or UE-specific signaling. For a specific implementation in which the base station indicates the first time window to the UE by using the first indication information and indicates the second time window to the UE by using the second indication information, refer to the embodiment corresponding to FIG. 5. Details are not described herein again.

605. The UE determines a third time window based on the first time window and the second time window.

Specifically, there are the following two relationships between the first time window and the second time window: The first time window does not overlap the second time window, or the first time window overlaps the second time window.

Figure 10:
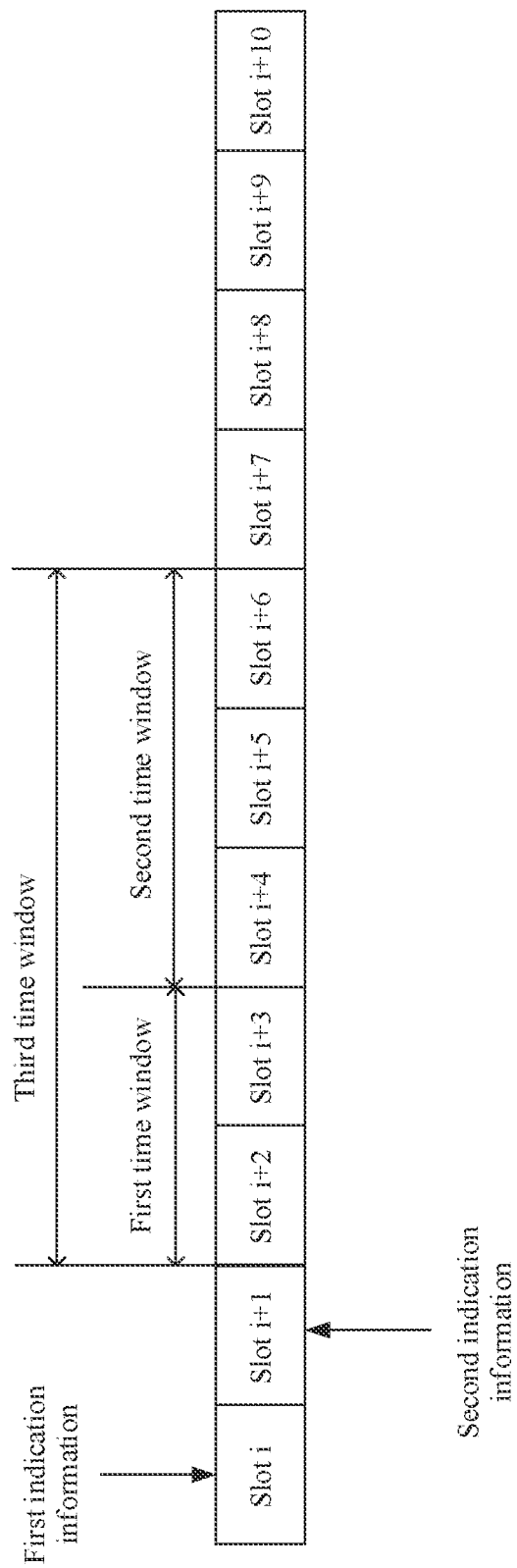
FIG. 10 is a schematic diagram 4 of a control information transmission method according to an embodiment of this application.

When the first time window does not overlap the second time window, the UE may determine that both the first indication information and the second indication information are valid. In this case, the determining, by the UE, a third time window based on the first time window and the second time window includes: determining, by the UE based on the first time window and the second time window, that the third time window is the first time window and the second time window. As shown in FIG. 10, the UE receives, in a slot i, the first indication information sent by the base station, where the first indication information indicates that the first time window includes slots (i+2 and i+3), and the UE receives, in a slot i+1, the second indication information sent by the base station, where the second indication information indicates that the second time window includes slots (i+4, i+5, and i+6). The UE may determine that both the first indication information and the second indication information are valid, and then determine that the third time window is (i+2, i+3, i+4, i+5, and i+6). Certainly, the UE may alternatively validate only the first indication information or the second indication information. When validating only the first indication information, the UE determines that the third time window is the first time window and includes the slots (i+2 and i+3). Alternatively, when the second indication information is latest indication information and the UE validates only the second indication information, the UE determines that the third time window is the second time window and includes the slots (i+4, i+5, and i+6). The foregoing merely uses an example in which the first time window is before the second time window for description. It may be understood that, in an example, if the first time window indicated by the first indication information is after the second time window indicated by the second indication information, and the UE may determine that both the first indication information and the second indication information are valid, the UE determines that the third time window is the first time window plus the second time window. Certainly, the UE may alternatively validate only the first indication information or the second indication information. When the UE validates only the first indication information, the UE determines the third time window is the first time window. Alternatively, when the second indication information is latest indication information and the UE validates only the second indication information, the UE determines that the third time window is the second time window.

Optionally, when the first time window overlaps the second time window, the determining, by the UE, a third time window based on the first time window and the second time window includes: if the second time window includes the first time window, or the first time window includes the second time window, determining that the third time window is the second time window, or determining that the third time window is the first time window; or if a start location of the first time window is before a start location of the second time window, and an end location of the first time window is between the start location and an end location of the second time window, determining that the third time window is from the start location of the first time window to the end location of the second time window, or determining that the third time window is the first time window or the second time window.

Figure 11:
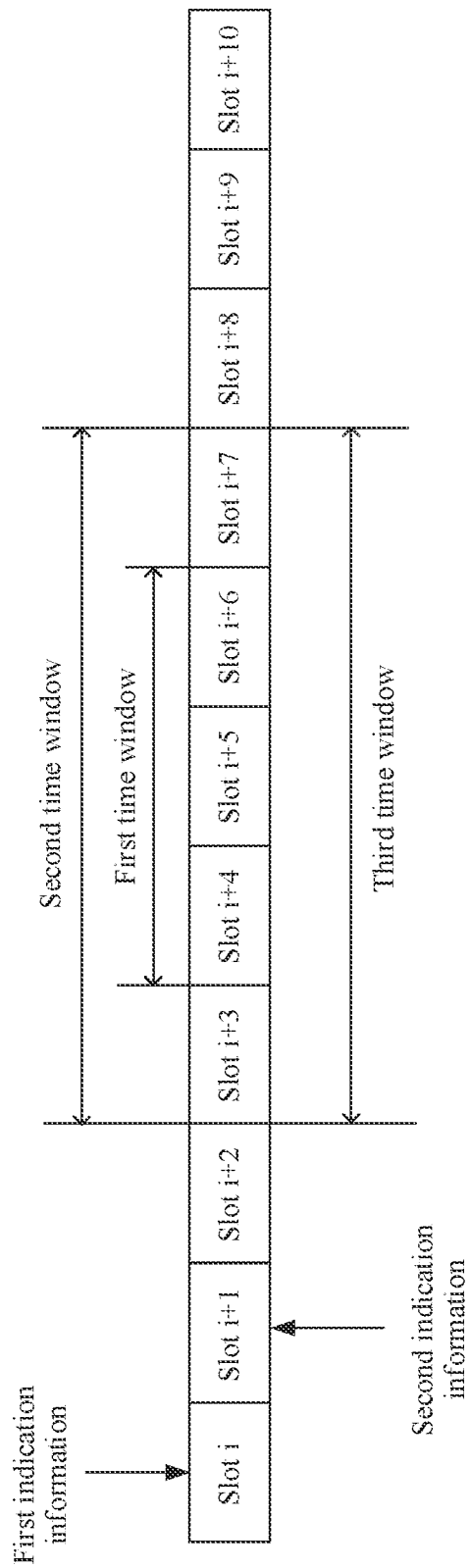
FIG. 11 is a schematic diagram 5 of a control information transmission method according to an embodiment of this application.

For example, as shown in FIG. 11, the UE receives, in a slot i, the first indication information sent by the base station, where the first indication information indicates that the first time window includes slots (i+4, i+5, and i+6), and the UE receives, in a slot i+1, the second indication information sent by the base station, where the second indication information indicates that the second time window includes slots (i+3, i+4, i+5, i+6, and i+7). The UE may determine that both the first indication information and the second indication information are valid, and then determine that the third time window is (i+3, i+4, i+5, i+6, and i+7). Certainly, the UE may alternatively validate only the first indication information or the second indication information. When validating only the first indication information, the UE determines that the third time window is the first time window and includes the slots (i+4, i+5, and i+6). Alternatively, when the second indication information is latest indication information and the UE validates only the second indication information, the UE determines that the third time window is the second time window and includes the slots (i+3, i+4, i+5, i+6, and i+7).

Figure 12:
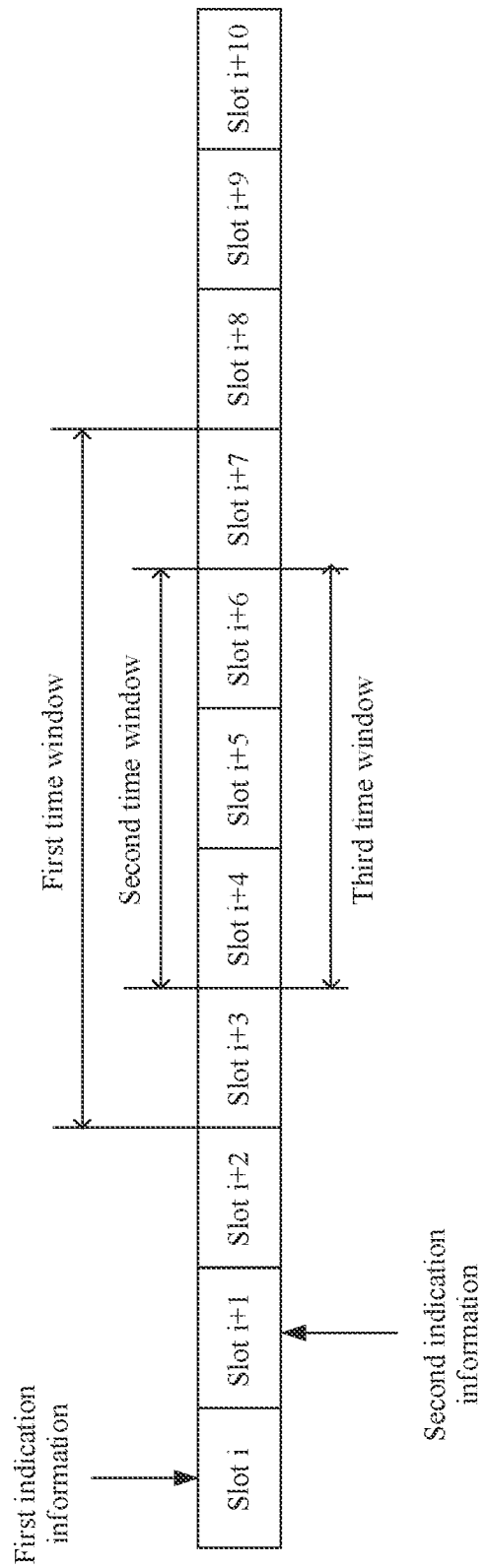
FIG. 12 is a schematic diagram 6 of a control information transmission method according to an embodiment of this application.

For example, as shown in FIG. 12, the UE receives, in a slot i, the first indication information sent by the base station, where the first indication information indicates that the first time window includes slots (i+3, i+4, i+5, i+6, and i+7), and the UE receives, in a slot i+1, the second indication information sent by the base station, where the second indication information indicates that the second time window includes slots (i+4, i+5, and i+6). The UE may determine that both the first indication information and the second indication information are valid, and then determine that the third time window is (i+3, i+4, i+5, i+6, and i+7). Certainly, the UE may alternatively validate only the first indication information or the second indication information. When validating only the first indication information, the UE determines that the third time window is the first time window and includes the slots (i+3, i+4, i+5, i+6, and i+7). Alternatively, when the second indication information is latest indication information and the UE validates only the second indication information, the UE determines that the third time window is the second time window and includes the slots (i+4, i+5, and i+6), as shown in FIG. 12.

Figure 13:
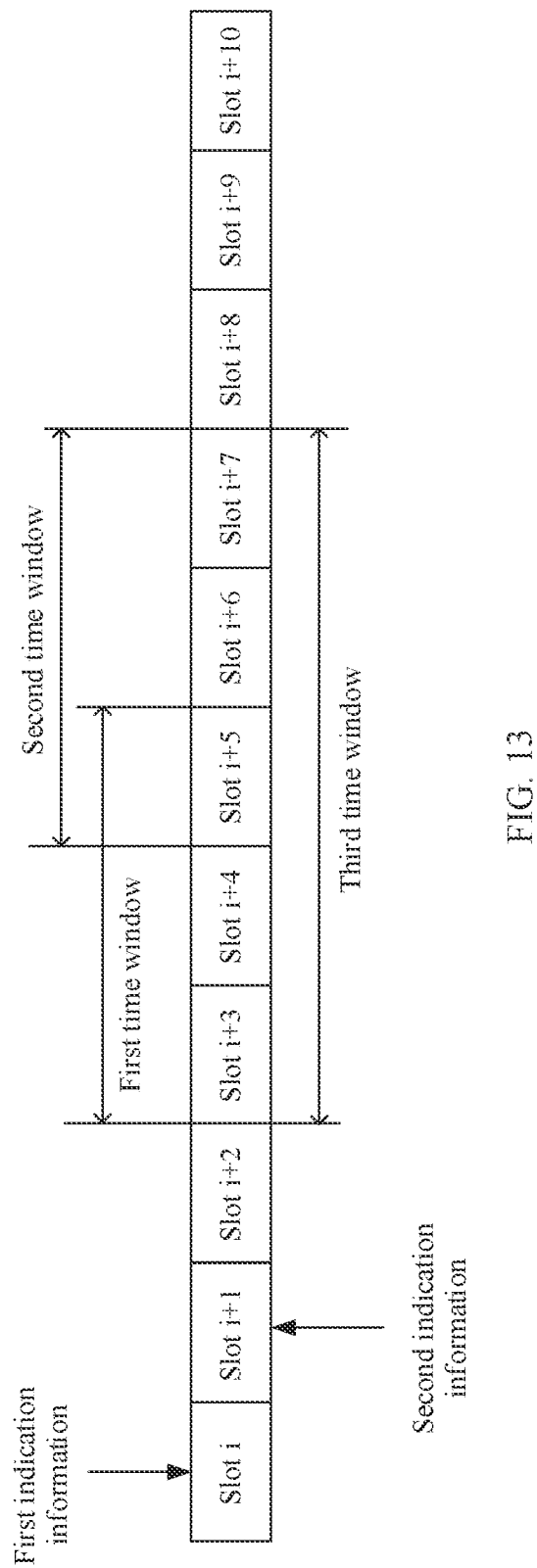
FIG. 13 is a schematic diagram 7 of a control information transmission method according to an embodiment of this application.

For example, as shown in FIG. 13, the UE receives, in a slot i, the first indication information sent by the base station, where the first indication information indicates that the first time window includes slots (+3, i+4, and i+5), and the UE receives, in a slot i+1, the second indication information sent by the base station, where the second indication information indicates that the second time window includes slots (i+5, i+6, and i+7). The UE may determine that both the first indication information and the second indication information are valid, and then determine that the third time window is (i+3, i+4, i+5, i+6, and i+7). Certainly, the UE may alternatively validate only the first indication information or the second indication information. When validating only the first indication information, the UE determines that the third time window is the first time window and includes the slots (i+3, i+4, and i+5). Alternatively, when the second indication information is latest indication information and the UE validates only the second indication information, the UE determines that the third time window is the second time window and includes the slots (i+5, i+6, and i+7).

Figure 14:
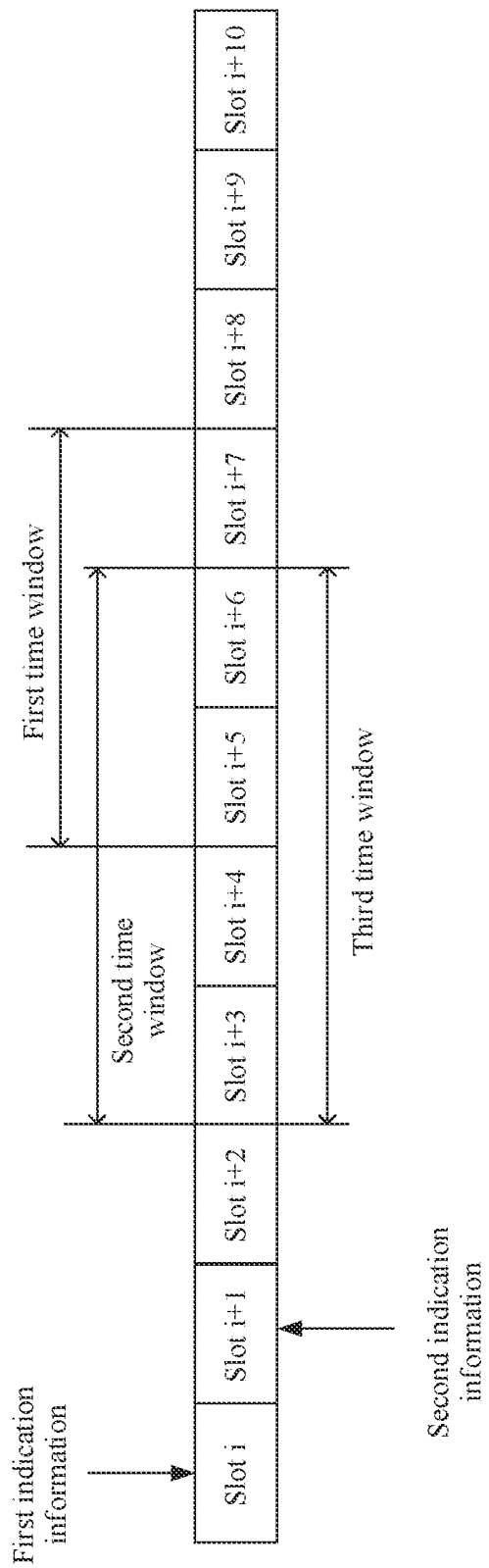
FIG. 14 is a schematic diagram 8 of a control information transmission method according to an embodiment of this application.

For example, as shown in FIG. 14, the UE receives, in a slot i, the first indication information sent by the base station, where the first indication information indicates that the first time window includes slots (i+5, i+6, and i+7), and the UE receives, in a slot i+1, the second indication information sent by the base station, where the second indication information indicates that the second time window includes slots (i+3, i+4, i+5, and i+6). The UE may determine that both the first indication information and the second indication information are valid, and then determine that the third time window is (i+3, i+4, i+5, i+6, and i+7). Certainly, the UE may alternatively validate only the first indication information or the second indication information. When validating only the first indication information, the UE determines that the third time window is the first time window and includes the slots (i+5, i+6, and i+7). Alternatively, when the second indication information is latest indication information and the UE validates only the second indication information, the UE determines that the third time window is the second time window and includes the slots (i+3, i+4, i+5, and i+6), as shown in FIG. 14.

606. The UE skips monitoring the physical downlink control channel PDCCH in the third time window.

607. The base station determines, based on the first time window and the second time window, the third time window in which the UE skips monitoring the physical downlink control channel PDCCH.

In the foregoing solution, an execution sequence of 605 and 607 is not limited. In other words, processes of determining the third time window by the base station and the UE may be performed independently. Similar to step 605, the base station also needs to determine the third time window based on the first time window and the second time window. A specific solution is: when the first time window does not overlap the second time window, the determining, by the base station based on the first time window and the second time window, a third time window in which the UE skips monitoring the physical downlink control channel PDCCH includes: determining, by the base station based on the first time window and the second time window, that the third time window in which the UE skips monitoring the physical downlink control channel PDCCH is the first time window and the second time window, or determining that the third time window in which the UE skips monitoring the physical downlink control channel PDCCH is the first time window or the second time window.

When the first time window overlaps the second time window, the determining, by the base station based on the first time window and the second time window, a third time window in which the UE skips monitoring the physical downlink control channel PDCCH includes: if the second time window includes the first time window, or the first time window includes the second time window, determining that the third time window in which the UE skips monitoring the physical downlink control channel PDCCH is the second time window, or determining that the third time window in which the UE skips monitoring the physical downlink control channel PDCCH is the first time window; or if a start location of the first time window is before a start location of the second time window, and an end location of the first time window is between the start location and an end location of the second time window, determining that the third time window in which the UE skips monitoring the physical downlink control channel PDCCH is from the start location of the first time window to the end location of the second time window, or determining that the third time window in which the UE skips monitoring the physical downlink control channel PDCCH is the first time window or the second time window. A specific manner of determining the third time window by the base station corresponds to the manner of determining the third time window by the UE. Refer to the solutions in FIG. 10 to FIG. 14. Details are not described again.

In the foregoing solution, the UE determines the third time window based on the first time window and the second time window as indicated by the base station, and skips monitoring the PDCCH in the third time window, thereby reducing power consumption of the UE. In addition, the base station may adjust, in time, the time window in real time based on a factor such as a scheduling policy or a service requirement. In this way, data transmission efficiency is improved. For example, the base station may need to re-indicate a time window in which the UE skips detecting the PDCCH. Therefore, in this application, a new piece of second indication information may be further sent to indicate the second time window After the UE receives the first indication information, if the base station sends the second indication information, the UE then receives the second indication information. The time window in which the UE finally skips detecting the PDCCH depends on a relationship between the first time window corresponding to the first indication information and the second time window corresponding to the second indication information.

Figure 15:
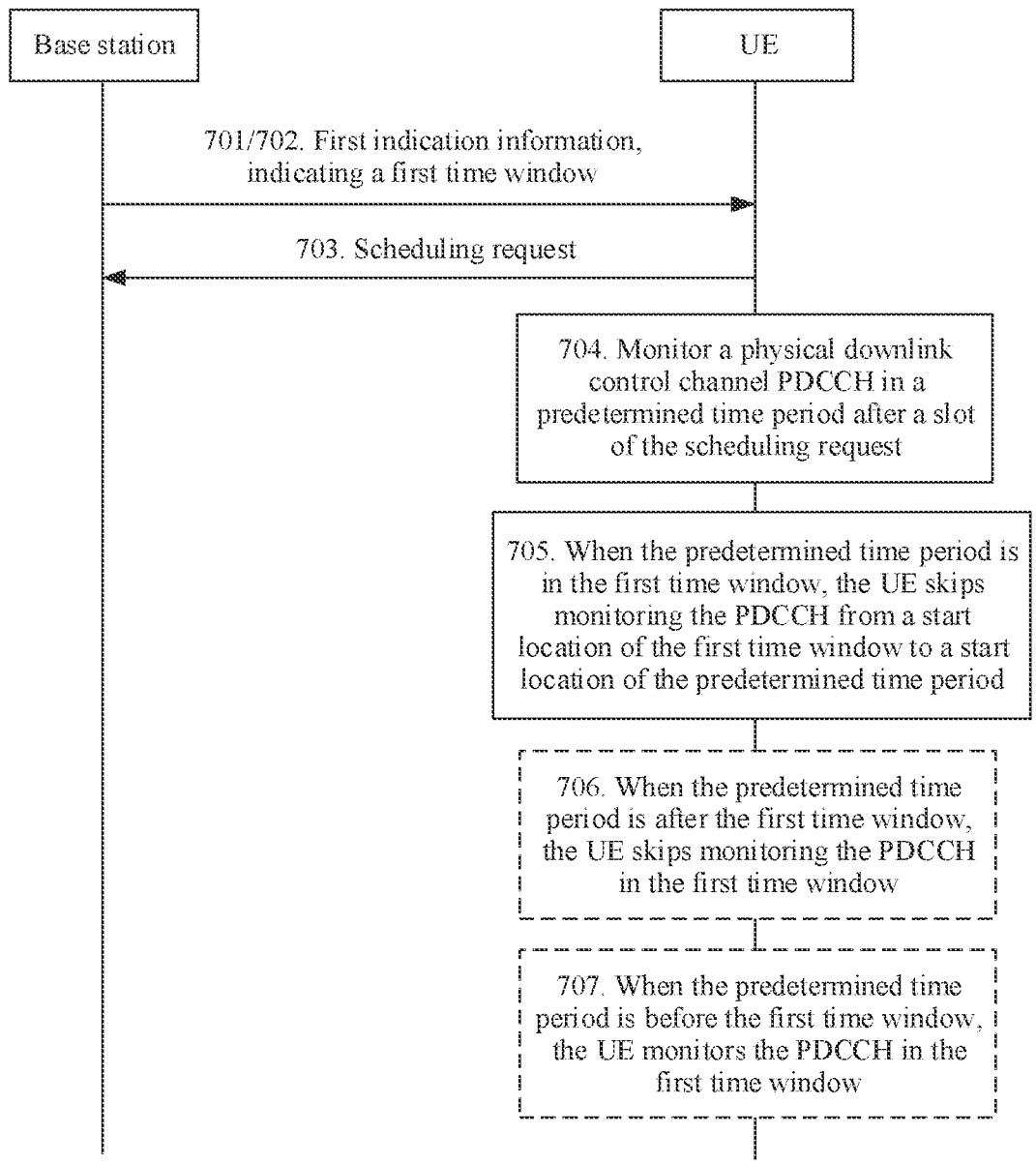
FIG. 15 is a schematic diagram of signaling interaction of a control information transmission method according to still another embodiment of this application.

Based on the solution provided in FIG. 5, the base station sends the first indication information to the UE, to indicate the UE to skip monitoring the PDCCH in the following first time window. However, after the UE receives the first indication information, if the UE needs to send uplink data, the UE first sends a scheduling request SR to the base station. After receiving the SR, the base station sends uplink scheduling information to the UE by using the PDCCH, and the UE receives the PDCCH to obtain the uplink scheduling information, and sends the uplink data to the base station based on the uplink scheduling information. If the base station sends the uplink scheduling information to the UE in the first time window by using the PDCCH, the UE needs to monitor the PDCCH in the first time window. Referring to FIG. 15, a process in which the UE determines a time window in which the PDCCH is not detected includes the following steps.

701. A base station sends first indication information to user equipment UE.

The first indication information indicate a first time window.

702. The user equipment UE receives the first indication information sent by the base station.

The first indication information indicate the first time window. The first indication information is sent by using downlink control information DCI, and the DCI may be group common signaling or UE-specific signaling. For a specific implementation in which the base station indicates the first time window to the UE by using the first indication information, refer to the embodiment corresponding to FIG. 5. Details are not described herein again.

703: The UE sends a scheduling request to the base station.

704. The UE monitors a physical downlink control channel PDCCH in a predetermined time after a time location of the scheduling request.

The UE may start to monitor the physical downlink control channel PDCCH in the predetermined time after the time location at which the SR is sent (for example, an $X^{th}$ slot after a slot in which the SR is located). The $X^{th}$ slot corresponding to the predetermined time may be a pre-defined value, or a value configured by the base station, where $X \geq 0$.

705. When the predetermined time is in the first time window, the UE skips monitoring the PDCCH from a start location of the first time window to a start location of the predetermined time.

Figure 16:
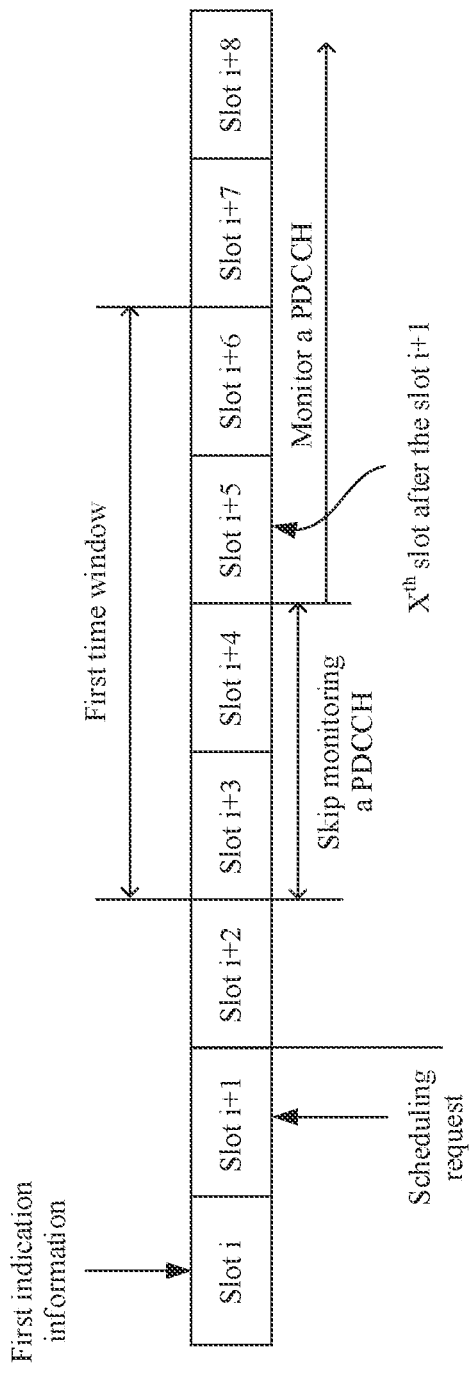
FIG. 16 is a schematic diagram 9 of a control information transmission method according to an embodiment of this application.

Specifically, as shown in FIG. 16, the UE receives, in a slot i, the first indication information sent by the base station, where the first indication information indicates that the first time window includes slots (i+3, i+4, i+5, and i+6), and the UE sends the SR to the base station in a slot i+1. In this case, the UE starts to monitor the physical downlink control channel PDCCH in an $X^{th}$ slot (i+5, where X=4) after the slot i+1, and the UE skips monitoring the PDCCH from the start location (the slot i+3) of the first time window to the start location (the slot i+4) of the predetermined time.

706. When the predetermined time is after the first time window, the UE skips monitoring the PDCCH in the first time window.

Figure 17:
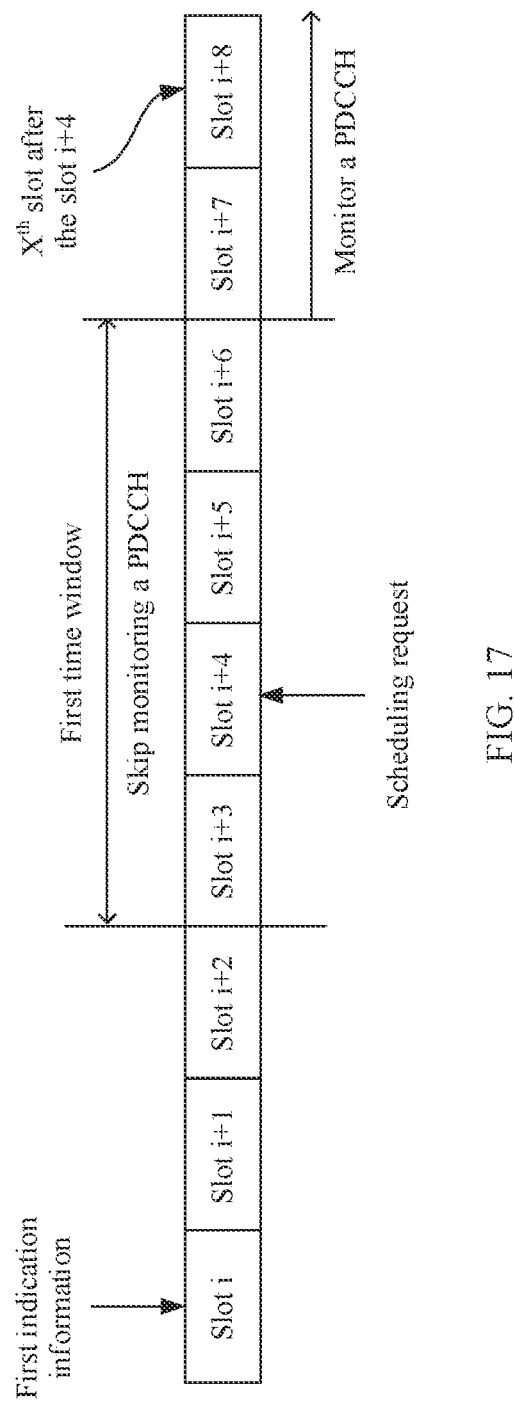
FIG. 17 is a schematic diagram 10 of a control information transmission method according to an embodiment of this application.

Specifically, as shown in FIG. 17, the UE receives, in a slot i, the first indication information sent by the base station, where the first indication information indicates that the first time window includes slots (i+3, i+4, i+5, and i+6), and the UE sends the SR to the base station in a slot i+4. In this case, an $X^{th}$ slot (i+8, where X=4) after the slot i+4 is after the first time window, and a slot i+7 is also after the first time window. In this case, the UE starts to monitor the physical downlink control channel PDCCH in the slot i+7, and the UE skips monitoring the PDCCH in the first time window (i+3, i+4, i+5, and i+6).

707. When the predetermined time is before the first time window, the UE monitors the PDCCH in the first time window.

Figure 18:
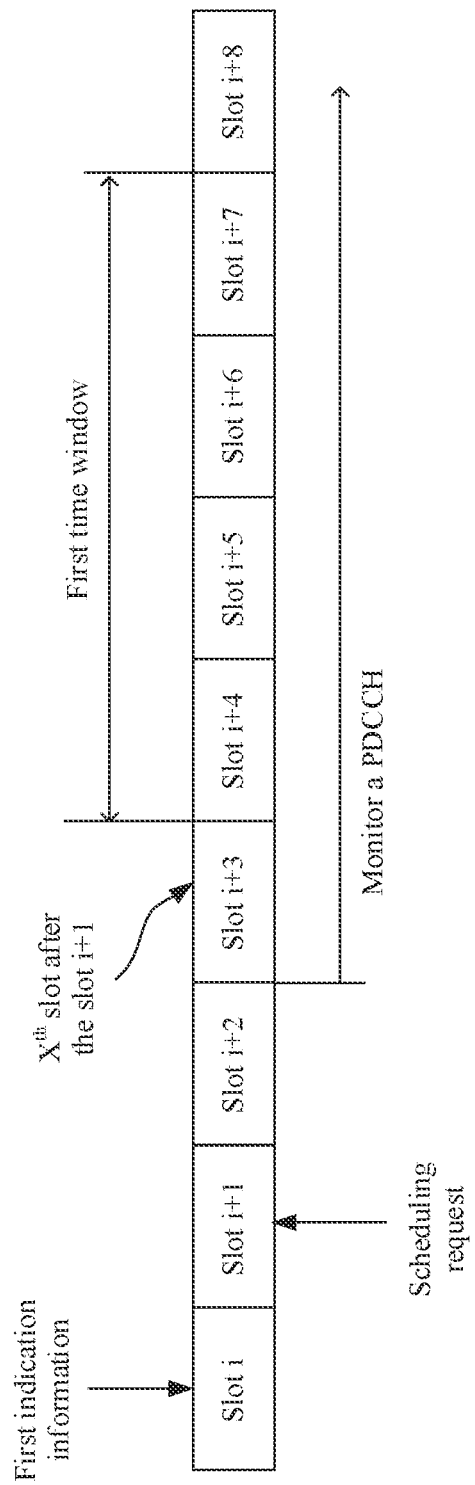
FIG. 18 is a schematic diagram 11 of a control information transmission method according to an embodiment of this application.

Specifically, as shown in FIG. 18, the UE receives, in a slot i, the first indication information sent by the base station, where the first indication information indicates that the first time window includes slots (i+4, i+5, i+6, and i+7), and the UE sends the SR to the base station in a slot i+1. In this case, an $X^{th}$ slot (i+3, where X=2) after a slot i+1 is before the first time window, and the slot i+7 is not in the first time window. In this case, the UE starts to monitor the PDCCH from the slot i+3. Therefore, the UE monitors the PDCCH also in the first time window.

The base station determines, based on the scheduling request and the first indication information, the time window in which the UE skips monitoring the physical downlink control channel PDCCH. Specifically, for a manner in which the base station determines, based on the scheduling request and the first indication information, the time window in which the UE skips monitoring the physical downlink control channel PDCCH, refer to the manners of determining the time window in which the UE skips monitoring the PDCCH in steps 705, 706, and 707. Details are not described herein again.

Further, this embodiment is also applicable to triggering the UE to switch from a low power consumption state to a high power consumption state. That is, the UE is in the low power consumption state, and when the UE sends an SR to the base station, the UE switches to the high power consumption state in a predetermined time after a time location of the scheduling request.

In the foregoing solution, the base station sends the first indication information to the UE, to indicate the UE to skip monitoring the PDCCH in the following first time window. In this way, the UE is in the low power consumption state in the first time window. However, after the UE receives the first indication information, if the UE needs to send uplink data, the UE first sends a scheduling request SR to the base station. After receiving the SR, the base station sends uplink scheduling information to the UE by using the PDCCH, and the UE receives the PDCCH to obtain the uplink scheduling information, and sends the uplink data to the base station based on the uplink scheduling information. If the base station sends the uplink scheduling information to the UE in the first time window by using the PDCCH, the UE needs to monitor the PDCCH in the first time window. In this case, the UE is in the high power consumption state. In this way, based on a location relationship between the scheduling request information and the first time window, when the predetermined time is in the first time window, the UE skips monitoring the PDCCH from the start location of the first time window to the start location of the predetermined time. In this way, power consumption of the UE is reduced. Because the UE monitors the PDCCH from the start location of the predetermined time to the end location of the first time window instead of monitoring the PDCCH after the first time window ends, a transmission delay is reduced. When the predetermined time is after the first time window, the UE skips monitoring the PDCCH in the first time window. In this way, the power consumption of the UE is reduced. However, when the predetermined time is before the first time window, the UE starts to monitor the PDCCH from the predetermined time, that is, the UE monitors the PDCCH also in the first time window, so that a transmission delay is reduced.

In the foregoing solution, after receiving the first indication information sent by the base station, because there is data to be sent to the base station, the UE first needs to send the scheduling request SR to the base station, and then the UE starts to monitor the PDCCH in the predetermined time after the scheduling request. In addition, because the first indication information indicates the first time window to the UE, the UE may determine, based on a location relationship between the predetermined time and the first time window, a time of skipping monitoring the PDCCH. For example, when the predetermined time is in the first time window, the UE skips monitoring the PDCCH from the start location of the first time window to the start location of the predetermined time; or when the predetermined time is after the first time window, the UE skips monitoring the PDCCH in the first time window; or only when the predetermined time is before the first time window, the UE monitors the PDCCH in the first time window to avoid that the UE cannot receive the uplink scheduling information sent by the base station. Compared with the prior art in which the PDCCH is periodically monitored, in the method provided in this embodiment of this application, the base station may actively trigger, in real time, the UE to skip monitoring the PDCCH, thereby reducing the power consumption of the UE.

Figure 19:
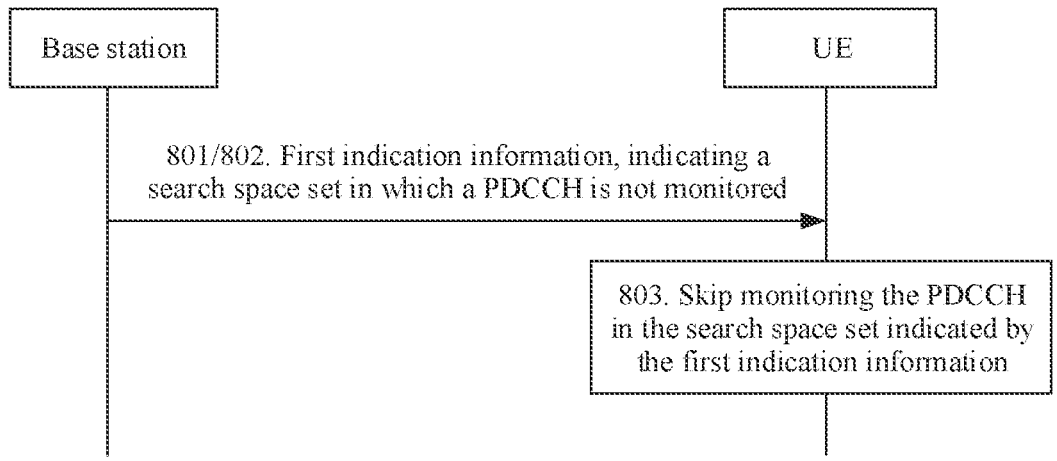
FIG. 19 is a schematic diagram of signaling interaction of a control information transmission method according to yet another embodiment of this application.

In NR, a plurality of search space sets may be configured for UE. In this application, the UE may be indicated to skip monitoring a PDCCH in a specific search space set or a specific type of search space sets, to reduce power consumption of the UE. Specifically, an embodiment of this application provides a control information transmission method. Referring to FIG. 19, the method includes the following steps.

801. A base station sends first indication information to user equipment UE.

The first indication information indicate a search space set in which the UE skips monitoring a PDCCH.

802. The user equipment UE receives the first indication information sent by the base station.

The first indication information is sent by using radio resource control RRC (radio resource control) signaling, a MAC CE (media access control control element, media access control control element), or downlink control information DCI, and the DCI may be group common signaling or UE-specific information.

803. The UE skips monitoring the PDCCH in the search space set indicated by the first indication information.

For example, the base station may send the first indication information to the UE in a current search space set, to indicate the UE to skip monitoring a PDCCH in the current search space set. For example, the first indication information may include a 1-bit flag bit. For example, a flag bit of "O" indicates that the UE skips monitoring the PDCCH in the current search space set. A flag bit of "1" indicates that the UE monitors the PDCCH in the current search space set.

Certainly, when a plurality of search space sets are configured for the UE, the first indication information may be further sent to the UE in the current search space set, to indicate the UE to skip monitoring a PDCCH in another search space set. In this case, the first indication information carries an identifier of the another search space set.

In addition, the base station may further group search space sets according to a specific rule. To reduce power consumption of PDCCH monitoring, the base station may indicate the UE to skip monitoring a PDCCH in a specific group of search space sets or a plurality of groups of search space sets. In this case, the base station may send the first indication information across groups. For example, the base station may send the first indication information to the UE in a search space set in a first group of search space sets, to indicate that a PDCCH in a second group of search space sets does not need to be detected. In this case, when sending the first indication information, the base station needs to indicate a specific group of search space sets to which the first indication information is applicable. For example, the first indication information may carry a group identifier of the second group of search space sets.

In this case, before step 801, the method may further include: obtaining, by the UE, configuration information, where the configuration information includes at least one group identifier, and each group identifier corresponds to a group of search space sets. It should be noted that the configuration information may be sent by the base station. For example, the base station notifies the UE of the configuration information by using RRC signaling, or the configuration information may be preconfigured by the UE or the configuration information may be preconfigured by the base station. In this case, the first indication information includes at least one group identifier, and step 803 is specifically that the UE skips monitoring the PDCCH in the search space sets that correspond to the group identifier and that are indicated by the first indication information.

Figure 20:
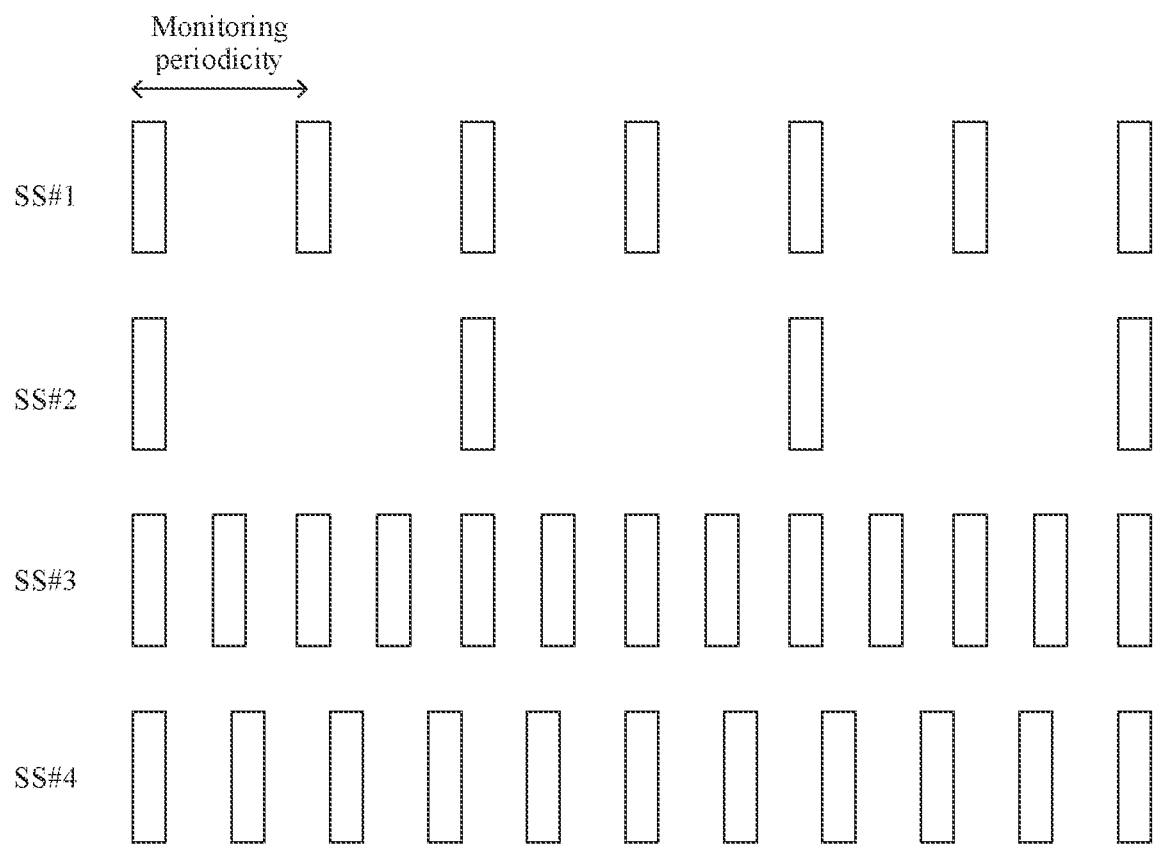
FIG. 20 is a schematic diagram of a manner of grouping search space sets according to an embodiment of this application.

For example, a plurality of search space sets may be grouped based on monitoring periodicities of PDCCHs. For example, search space sets with a monitoring periodicity greater than a monitoring periodicity threshold are grouped into one group, and search space sets with a monitoring periodicity less than a monitoring periodicity threshold are grouped into one group, or a plurality of search space sets are grouped into a plurality of groups based on threshold intervals to which the monitoring periodicities belong. As shown in FIG. 20, four search space sets with different monitoring periodicities are shown. SS #3 and SS #4 with shorter monitoring periodicities may be considered as a first group of search space sets, and a group identifier is allocated to the first group of search space sets. SS #1 and SS #2 with longer monitoring periodicities are considered as a second group of search space sets, and a group identifier is allocated to the second group of search space sets. The search space sets may be classified based on types of the search space sets. For example, common search space sets are considered as one group, and UE-specific search space sets are considered as one group. The search space sets may be classified based on carriers of the search space sets. For example, search space sets on a primary carrier are considered as one group, and search space sets on a secondary carrier are considered as one group. The search space sets may be grouped based on BWPs (bandwidth part, bandwidth part). Search space sets of a first BWP are considered as one group, search space sets of a second BWP are considered as one group, and so on. The search space sets may be classified based on types of the search space sets. For example, common search space sets are considered as a type, and UE-specific search space sets are considered as a type.

After the UE obtains configurations and a grouping status of the search space sets based on the configuration information, the UE monitors the PDCCH based on the configured search space sets. When services are reduced, to reduce power consumption, the UE does not want to frequently monitor the PDCCH. The foregoing grouping in FIG. 20 is used as an example. The base station sends the first indication information by using DCI of the first group of search space sets, to indicate the UE to skip detecting the PDCCH in the first group of search space sets in a next period of time, as shown in FIG. 20. The first indication information may be sent by using DCI in SS #3 or SS #4. In this case, the UE monitors only PDCCHs corresponding to SS #1 and SS #2, but skips monitoring PDCCHs corresponding to SS #3 and SS #4. Certainly, with reference to the embodiment corresponding to FIG. 5, the first indication information may be further used to indicate the first time window. In this case, after the first indication information is sent by using the DCI in SS #3 or SS #4, the UE monitors, in the first time window, only the PDCCHs corresponding to SS #1 and SS #2, but skips monitoring the PDCCHs corresponding to SS #3 and SS #4.

Figure 21:
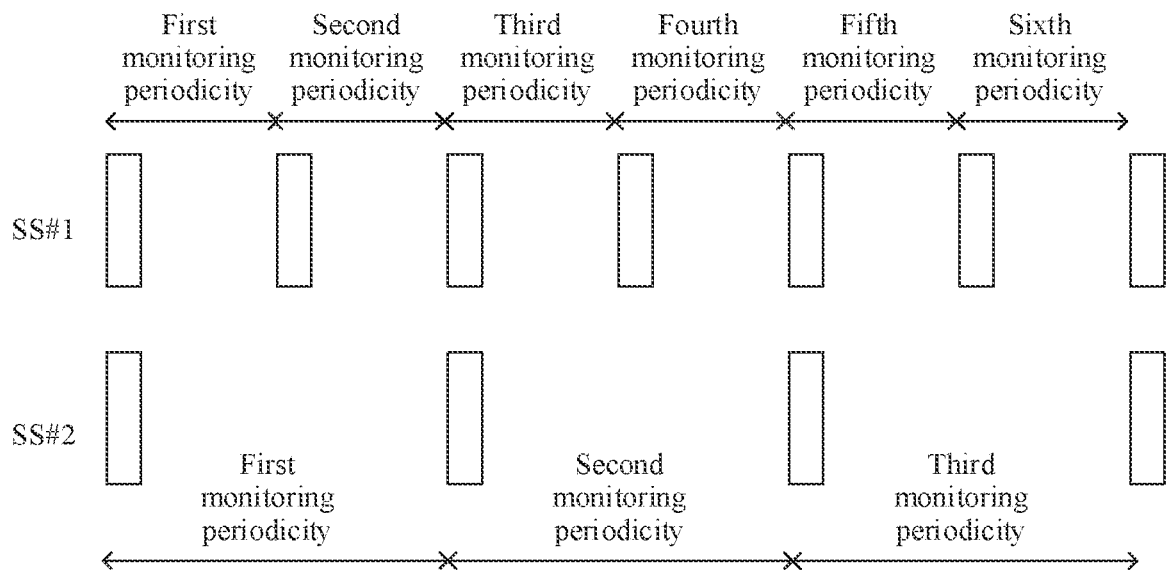
FIG. 21 is a schematic diagram 12 of a control information transmission method according to an embodiment of this application.

In addition, based on the foregoing solution, the UE may not monitor a PDCCH in one or more groups of search space sets in a predetermined time window based on the received first indication information. For another example, when the UE skips monitoring a PDCCH in the first group of search space sets (for example, when the UE is in the first time window), the base station sends fourth indication information (for example, a DCI indication) by using a search space set in the second group of search space sets, to indicate the UE to resume PDCCH monitoring in the first group of search space sets. For example, in FIG. 20, DCI may be sent in SS #1 or SS #2 to indicate the UE to resume PDCCH monitoring in following SS #3 and SS #4. For another example, when the UE skips monitoring a PDCCH in the search space sets on the secondary carrier, DCI in the search space sets on the primary carrier may be used to indicate the UE to monitor the PDCCH in the search space sets on the secondary carrier. In addition, if a monitoring periodicity of a first search space set is shorter than a monitoring periodicity of a second search space set, and a PDCCH monitoring time in the monitoring periodicity of the second search space set is included in a PDCCH monitoring time in the monitoring periodicity of the first search space set, even if the UE is indicated to skip monitoring the PDCCH in the first search space set with a relatively short monitoring periodicity, when the UE monitors the PDCCH in the second search space set with a relatively long monitoring periodicity, the UE monitors the PDCCH in the first search space set with a relatively short monitoring periodicity based on the monitoring periodicity of the second search space set with a relatively long monitoring periodicity. For example, as shown in FIG. 21, based on the first indication information, the UE skips monitoring the PDCCH in SS #1, and the UE monitors the PDCCH in SS #2. One monitoring periodicity of SS #2 includes two monitoring periodicities of SS #1. A PDCCH monitoring time in a first monitoring periodicity of SS #1 is included in a PDCCH monitoring time in a first monitoring periodicity of SS #2, and a PDCCH monitoring time in a second monitoring periodicity of SS #1 has no corresponding PDCCH monitoring time in SS #2. A PDCCH monitoring time in a third monitoring periodicity of SS #1 is included in a PDCCH monitoring time in a second monitoring periodicity of SS #2, and a PDCCH monitoring time in a fourth monitoring periodicity of SS #1 has no corresponding PDCCH monitoring time in SS #2. This cycle is repeated. In this case, the UE monitors the PDCCH also in the PDCCH monitoring time in the first monitoring periodicity, the PDCCH monitoring time in the third monitoring periodicity, and the PDCCH monitoring time in a fifth monitoring periodicity of SS #1.

In this way, the UE may skip, based on the first indication information sent by the base station, monitoring the PDCCH in the search space set indicated by the first indication information. Compared with the prior art in which the PDCCH is periodically monitored, in the method provided in this embodiment of this application, the base station may actively trigger, in real time, the UE to skip monitoring the PDCCH, thereby reducing power consumption of the UE.

An embodiment of this application provides a control information transmission apparatus. The control information transmission apparatus is user equipment UE or a chip in UE. The control information transmission apparatus is configured to perform the control information transmission method provided in the embodiment corresponding to FIG. 5. The control information transmission apparatus provided in this embodiment of this application may include modules corresponding to corresponding steps.

In this embodiment of this application, the control information transmission apparatus may be divided into function modules based on the control information transmission method provided in the embodiment corresponding to FIG. 5. For example, each function module may be obtained through division based on each corresponding function, or two or more functions may be integrated into one processing module. The integrated module may be implemented in a form of hardware, or may be implemented in a form of a software function module. In this embodiment of this application, division into modules is used as an example, and is merely logical function division. During actual implementation, another division manner may be used.

Figure 22:
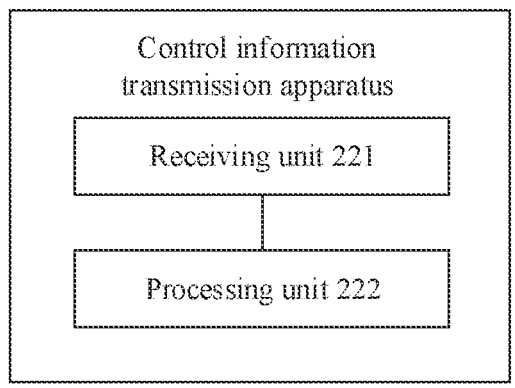
FIG. 22 is a schematic structural diagram of a control information transmission apparatus according to an embodiment of this application.

When each function module is obtained through division based on each corresponding function, referring to FIG. 22, a manner of dividing the control information transmission apparatus into function modules is provided. The control information transmission apparatus includes a receiving unit 221 and a processing unit 222. Functions implemented by the units and modules provided in this application are specifically as follows: The receiving unit 221 is configured to receive first indication information sent by a base station, where the first indication information indicate a first time window. The processing unit 222 is configured to skip monitoring a physical downlink control channel PDCCH in the first time window indicated by the first indication information received by the receiving unit.

In an example solution, the first indication information includes at least one of the following: duration of the first time window; or a start location of the first time window.

More specifically, when the first time window may include at least one slot, and the first indication information includes the duration of the first time window, the receiving unit 221 is specifically configured to receive, in a first slot, the first indication information sent by the base station; and the processing unit 222 is configured to: determine an X slot after the first slot as a start slot of the first time window, and determine the first time window based on the start slot and the duration of the first time window.

In addition, if the base station sends scheduling information to the UE before sending a first indication, the receiving unit 221 is further configured to receive the scheduling information sent by the base station, where the scheduling information indicate information about a time domain for sending data by the base station to the UE; and the processing unit 222 is configured to: determine a next slot of a predetermined slot after a PDSCH transmission slot ends as the start slot of the first time window, and determine the first time window based on the start slot and the duration of the first time window. The first indication information and the scheduling information may be separately sent, or may be carried in same DCI.

When the first indication information includes the start location of the first time window, the processing unit 222 is configured to determine the first time window based on predetermined window duration and the start location of the first time window, where the predetermined window duration indicate the duration of the first time window. The predetermined window duration may be fixed duration, or any duration preconfigured by the base station.

In addition, the first indication information may further include both the duration of the first time window and the start location of the first time window.

Optionally, the first indication information is sent by using downlink control information DCI. For example, the DCI is group common signaling.

Certainly, the control information transmission apparatus provided in this embodiment of this application includes but is not limited to the foregoing modules. For example, the control information transmission apparatus may further include a storage unit. The storage unit may be configured to store program code of the control information transmission apparatus. All related content of the steps in the foregoing method embodiments may be cited in function descriptions of corresponding function modules. Details are not described herein again.

When the control information transmission apparatus is UE or a chip in UE, the processing unit 222 may be the processor 301 in FIG. 3. The receiving unit 221 may be the communications interface 310 or the radio frequency circuit 302 in FIG. 3. When the control information transmission apparatus runs, the control information transmission apparatus performs the steps performed by the UE in the embodiment corresponding to FIG. 5.

An embodiment of this application provides a control information transmission apparatus. The control information transmission apparatus is user equipment UE or a chip in UE. The control information transmission apparatus is configured to perform the control information transmission method provided in the embodiment corresponding to FIG. 9. The control information transmission apparatus provided in this embodiment of this application may include modules corresponding to corresponding steps.

Figure 9:
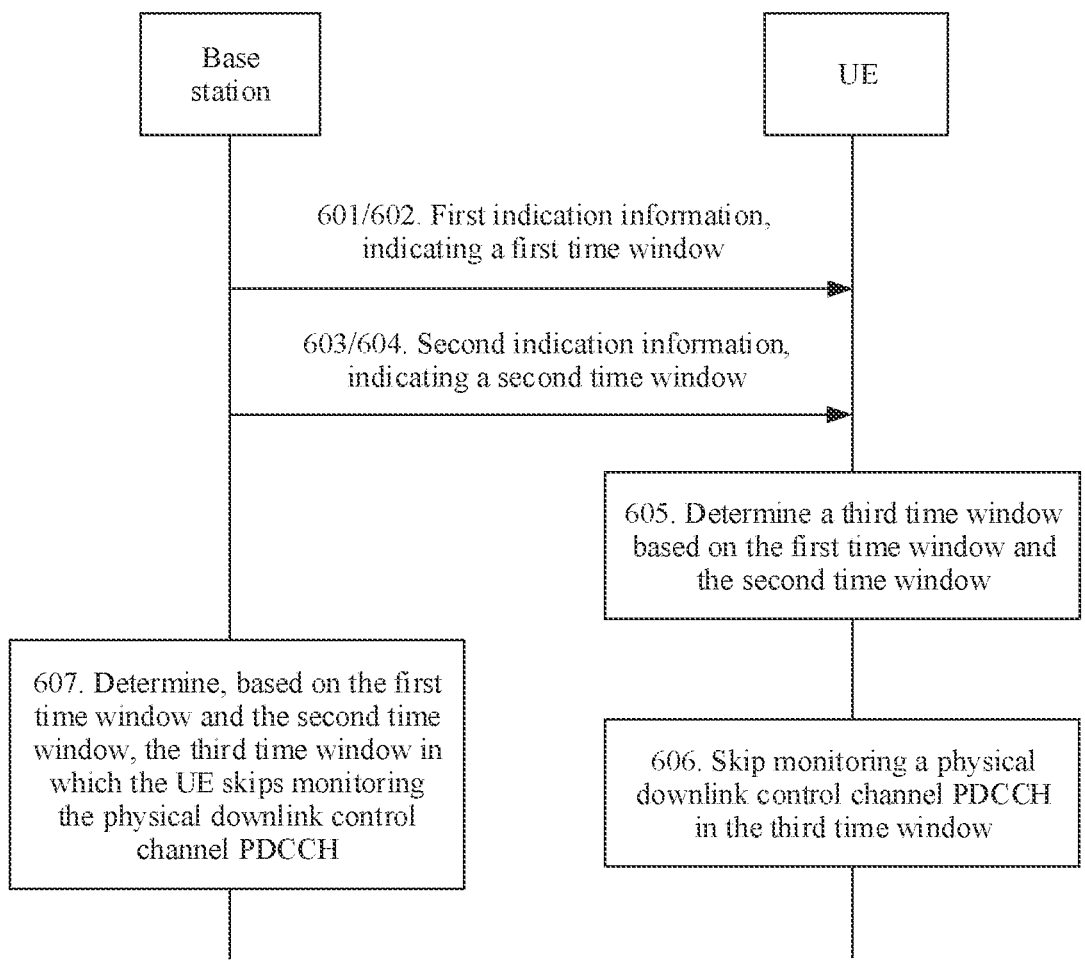
FIG. 9 is a schematic diagram of signaling interaction of a control information transmission method according to another embodiment of this application.

In this embodiment of this application, the control information transmission apparatus may be divided into function modules based on the control information transmission method provided in the embodiment corresponding to FIG. 9. For example, each function module may be obtained through division based on each corresponding function, or two or more functions may be integrated into one processing module. The integrated module may be implemented in a form of hardware, or may be implemented in a form of a software function module. In this embodiment of this application, division into modules is used as an example, and is merely logical function division. During actual implementation, another division manner may be used.

Figure 23:
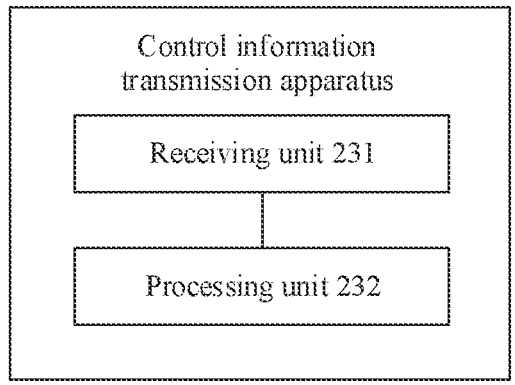
FIG. 23 is a schematic structural diagram of a control information transmission apparatus according to another embodiment of this application.

When each function module is obtained through division based on each corresponding function, referring to FIG. 23, a manner of dividing the control information transmission apparatus into function modules is provided. The control information transmission apparatus includes a receiving unit 231 and a processing unit 232. Functions implemented by the units and modules provided in this application are specifically as follows: The receiving unit 231 is configured to receive first indication information sent by a base station, where the first indication information indicate a first time window; and further configured to receive second indication information sent by the base station, where the second indication information indicate a second time window. The processing unit 232 is configured to determine a third time window based on the first time window indicated by the first indication information and the second time window indicated by the second indication information that are received by the receiving unit, and the processing unit 232 is further configured to skip monitoring a physical downlink control channel PDCCH in the third time window.

Optionally, the first time window does not overlap the second time window, or the first time window overlaps the second time window.

Optionally, when the first time window does not overlap the second time window, the processing unit 232 is specifically configured to: determine, based on the first time window and the second time window, that the third time window is the first time window and the second time window, or determine that the third time window is the first time window or the second time window.

Optionally, when the first time window overlaps the second time window, the processing unit 232 is specifically configured to: if the second time window includes the first time window, or the first time window includes the second time window, determine that the third time window is the second time window, or determine that the third time window is the first time window; or the processing unit 232 is specifically configured to: if a start location of the first time window is before a start location of the second time window, and an end location of the first time window is between the start location and an end location of the second time window, determine that the third time window is from the start location of the first time window to the end location of the second time window, or determine that the third time window is the first time window or the second time window.

Optionally, the first indication information and/or the second indication information is sent by using downlink control information DC. For example, the DCI is group common signaling.

Certainly, the control information transmission apparatus provided in this embodiment of this application includes but is not limited to the foregoing modules. For example, the control information transmission apparatus may further include a storage unit. The storage unit may be configured to store program code of the control information transmission apparatus. All related content of the steps in the foregoing method embodiments may be cited in function descriptions of corresponding function modules. Details are not described herein again.

When the control information transmission apparatus is UE or a chip in UE, the processing unit 232 may be the processor 301 in FIG. 3. The receiving unit 231 may be the communications interface 310 or the radio frequency circuit 302 in FIG. 3. When the control information transmission apparatus runs, the control information transmission apparatus performs the steps performed by the UE in the embodiment corresponding to FIG. 9.

An embodiment of this application provides a control information transmission apparatus. The control information transmission apparatus is user equipment UE or a chip in UE. The control information transmission apparatus is configured to perform the control information transmission method provided in the embodiment corresponding to FIG. 15. The control information transmission apparatus provided in this embodiment of this application may include modules corresponding to corresponding steps.

In this embodiment of this application, the control information transmission apparatus may be divided into function modules based on the examples of the control information transmission method provided in the embodiment corresponding to FIG. 15. For example, each function module may be obtained through division based on each corresponding function, or two or more functions may be integrated into one processing module. The integrated module may be implemented in a form of hardware, or may be implemented in a form of a software function module. In this embodiment of this application, division into modules is used as an example, and is merely logical function division. During actual implementation, another division manner may be used.

Figure 24:
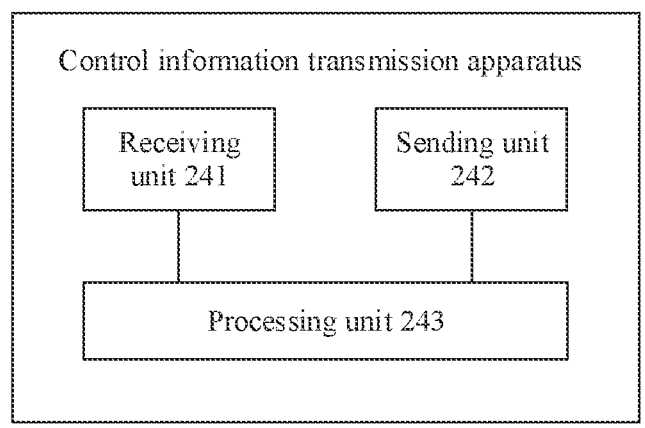
FIG. 24 is a schematic structural diagram of a control information transmission apparatus according to still another embodiment of this application.

When each function module is obtained through division based on each corresponding function, referring to FIG. 24, a manner of dividing the control information transmission apparatus into function modules is provided. The control information transmission apparatus includes a receiving unit 241, a sending unit 242, and a processing unit 243. Functions implemented by the units and modules provided in this application are specifically as follows: The receiving unit 241 is configured to receive first indication information sent by a base station, where the first indication information indicate a first time window. The sending unit 242 is configured to send a scheduling request to the base station. The processing unit 243 is configured to monitor a physical downlink control channel PDCCH in a predetermined time after a time location of the scheduling request. The processing unit 243 is further configured to: when the predetermined time is in the first time window, skip monitoring the PDCCH from a start location of the first time window to a start location of the predetermined time; or the processing unit 243 is further configured to: when the predetermined time is after the first time window, skip monitoring the PDCCH in the first time window, or the processing unit 243 is further configured to: when the predetermined time is before the first time window, skip monitoring the PDCCH in the first time window.

Optionally, the first indication information is sent by using downlink control information DC. For example, the DCI is group common signaling.

Certainly, the control information transmission apparatus provided in this embodiment of this application includes but is not limited to the foregoing modules. For example, the control information transmission apparatus may further include a storage unit. The storage unit may be configured to store program code of the control information transmission apparatus. All related content of the steps in the foregoing method embodiments may be cited in function descriptions of corresponding function modules. Details are not described herein again.

When the control information transmission apparatus is UE or a chip in UE, the processing unit 243 may be the processor 301 in FIG. 3. The receiving unit 241 and the sending unit 242 may be the communications interface 310 or the radio frequency circuit 302 in FIG. 3. When the control information transmission apparatus runs, the control information transmission apparatus performs the steps performed by the UE in the embodiment corresponding to FIG. 15.

An embodiment of this application provides a control information transmission apparatus. The control information transmission apparatus is user equipment UE or a chip in UE. The control information transmission apparatus is configured to perform the control information transmission method provided in the embodiment corresponding to FIG. 19. The control information transmission apparatus provided in this embodiment of this application may include modules corresponding to corresponding steps.

In this embodiment of this application, the control information transmission apparatus may be divided into function modules based on the control information transmission method provided in the embodiment corresponding to FIG. 19. For example, each function module may be obtained through division based on each corresponding function, or two or more functions may be integrated into one processing module. The integrated module may be implemented in a form of hardware, or may be implemented in a form of a software function module. In this embodiment of this application, division into modules is used as an example, and is merely logical function division. During actual implementation, another division manner may be used.

Figure 25:
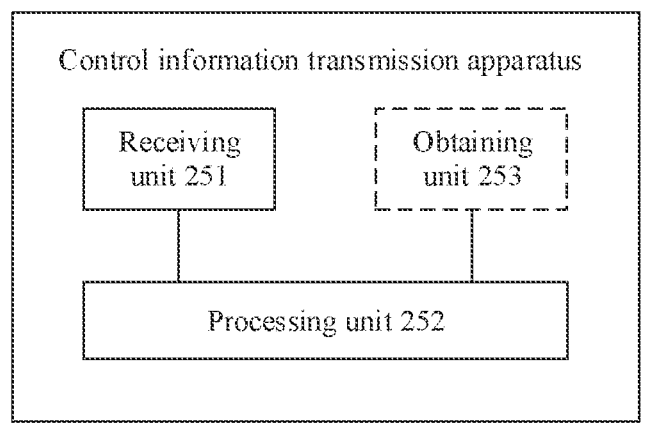
FIG. 25 is a schematic structural diagram of a control information transmission apparatus according to yet another embodiment of this application.

When each function module is obtained through division based on each corresponding function, referring to FIG. 25, a manner of dividing the control information transmission apparatus into function modules is provided. The control information transmission apparatus includes a receiving unit 251 and a processing unit 252. Functions implemented by the units and the modules provided in this application are specifically as follows: The receiving unit 251 is configured to receive first indication information sent by a base station, where the first indication information indicate a search space set in which a PDCCH is not monitored. The processing unit 252 is configured to skip monitoring the PDCCH in the search space set indicated by the first indication information.

Optionally, the control information transmission apparatus further includes an obtaining unit 253, configured to obtain configuration information, where the configuration information includes at least one group identifier, and each group identifier corresponds to a group of search space sets; and the first indication information includes the at least one group identifier, and the processing unit 252 is specifically configured to skip monitoring the PDCCH in the search space sets that correspond to the group identifier and that are indicated by the first indication information.

Optionally, the first indication information is sent by using downlink control information DC. For example, the DCI is group common signaling.

Certainly, the control information transmission apparatus provided in this embodiment of this application includes but is not limited to the foregoing modules. For example, the control information transmission apparatus may further include a storage unit. The storage unit may be configured to store program code of the control information transmission apparatus. All related content of the steps in the foregoing method embodiments may be cited in function descriptions of corresponding function modules. Details are not described herein again.

When the control information transmission apparatus is UE or a chip in UE, the processing unit 252 may be the processor 301 in FIG. 3. The receiving unit 251 may be the communications interface 310 or the radio frequency circuit 302 in FIG. 3. When the obtaining unit 253 is configured to obtain the configuration information from another device (for example, a base station), the obtaining unit 253 may be the communications interface 310 or the radio frequency circuit 302 in FIG. 3. When the configuration information is a default configuration of the UE, the obtaining unit 253 may be the processor 301 in FIG. 3. When the control information transmission apparatus runs, the control information transmission apparatus performs the steps performed by the UE in the embodiment corresponding to FIG. 19.

An embodiment of this application provides a control information transmission apparatus. The control information transmission apparatus is a base station or a chip in a base station. The control information transmission apparatus is configured to perform the control information transmission methods provided in the embodiments corresponding to FIG. 5, FIG. 9, and FIG. 15. The control information transmission apparatus provided in this embodiment of this application may include modules corresponding to corresponding steps.

In this embodiment of this application, the control information transmission apparatus may be divided into function modules based on the control information transmission methods provided in the embodiments corresponding to FIG. 5, FIG. 9, and FIG. 15. For example, each function module may be obtained through division based on each corresponding function, or two or more functions may be integrated into one processing module. The integrated module may be implemented in a form of hardware, or may be implemented in a form of a software function module. In this embodiment of this application, division into modules is used as an example, and is merely logical function division. During actual implementation, another division manner may be used.

Figure 26:
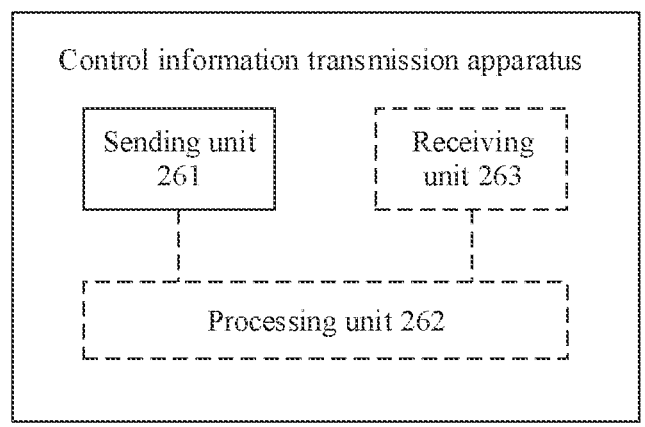
FIG. 26 is a schematic structural diagram of a control information transmission apparatus according to still yet another embodiment of this application.

When each function module is obtained through division based on each corresponding function, referring to FIG. 26, a manner of dividing the control information transmission apparatus into function modules is provided. The control information transmission apparatus includes a sending unit 261. Functions implemented by the units and modules provided in this application are specifically as follows: The sending unit 261 is configured to send first indication information to user equipment UE, where the first indication information indicate a first time window in which the UE skips monitoring a physical downlink control channel PDCCH.

Optionally, the first indication information includes at least one of the following: duration of the first time window; or a start slot of the first time window.

Optionally, the sending unit 261 is further configured to send second indication information to the UE, where the second indication information indicate a second time window. A processing unit 262 is configured to determine, based on the first time window and the second time window, a third time window in which the UE skips monitoring the physical downlink control channel PDCCH.

Optionally, the first time window does not overlap the second time window, or the first time window overlaps the second time window.

Optionally, when the first time window does not overlap the second time window, the processing unit 262 is specifically configured to: determine, based on the first time window and the second time window, that the third time window in which the UE skips monitoring the physical downlink control channel PDCCH is the first time window and the second time window; or determine that the third time window in which the UE skips monitoring the physical downlink control channel PDCCH is the first time window or the second time window.

Optionally, when the first time window overlaps the second time window, the processing unit 262 is specifically configured to: if the second time window includes the first time window, or the first time window includes the second time window, determine that the third time window in which the UE skips monitoring the physical downlink control channel PDCCH is the second time window, or determine that the third time window in which the UE skips monitoring the physical downlink control channel PDCCH is the first time window.

Alternatively, the processing unit 262 is specifically configured to: if a start location of the first time window is before a start location of the second time window, and an end location of the first time window is between the start location and an end location of the second time window, determine that the third time window in which the UE skips monitoring the physical downlink control channel PDCCH is from the start location of the first time window to the end location of the second time window, or determine that the third time window in which the UE skips monitoring the physical downlink control channel PDCCH is the first time window or the second time window.

Optionally, the first indication information and/or the second indication information is sent by using downlink control information DCI.

Optionally, the control information transmission apparatus further includes a receiving unit 263, configured to receive a scheduling request sent by the UE.

The processing unit 262 is further configured to determine, based on the first indication information and the scheduling request that is received by the receiving unit, a time window in which the UE skips monitoring the physical downlink control channel PDCCH.

Certainly, the control information transmission apparatus provided in this embodiment of this application includes but is not limited to the foregoing modules. For example, the control information transmission apparatus may further include a storage unit. The storage unit may be configured to store program code of the control information transmission apparatus. All related content of the steps in the foregoing method embodiments may be cited in function descriptions of corresponding function modules. Details are not described herein again.

When the control information transmission apparatus is a base station or a chip in a base station, the processing unit 262 may be the processor 41 in FIG. 4, and the receiving unit 261 may be the transceiver 42 in FIG. 4. When the control information transmission apparatus runs, the control information transmission apparatus performs the steps performed by the base stations in the control information transmission methods provided in the embodiments corresponding to FIG. 5, FIG. 9, and FIG. 15.

An embodiment of this application provides a control information transmission apparatus. The control information transmission apparatus is a base station or a chip in a base station. The control information transmission apparatus is configured to perform the control information transmission method provided in the embodiment corresponding to FIG. 19. The control information transmission apparatus provided in this embodiment of this application may include modules corresponding to corresponding steps.

In this embodiment of this application, the control information transmission apparatus may be divided into function modules based on the control information transmission method provided in the embodiment corresponding to FIG. 19. For example, each function module may be obtained through division based on each corresponding function, or two or more functions may be integrated into one processing module. The integrated module may be implemented in a form of hardware, or may be implemented in a form of a software function module. In this embodiment of this application, division into modules is used as an example, and is merely logical function division. During actual implementation, another division manner may be used.

Figure 27:
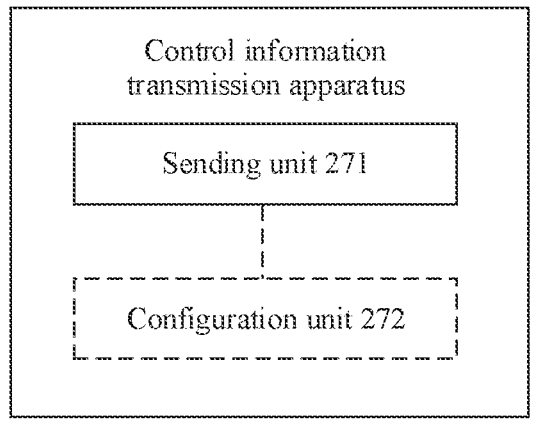
FIG. 27 is a schematic structural diagram of a control information transmission apparatus according to a still yet further embodiment of this application.

When each function module is obtained through division based on each corresponding function, referring to FIG. 27, a manner of dividing the control information transmission apparatus into function modules is provided. The control information transmission apparatus includes a sending unit 271. Functions implemented by the units and modules provided in this application are specifically as follows: The sending unit 271 is configured to send first indication information to user equipment UE, where the first indication information indicate a search space set in which the UE skips monitoring a PDCCH.

Optionally, the control information transmission apparatus further includes: a configuration unit 272, configured to send configuration information to the UE, or preconfigure the configuration information, where the configuration information includes at least one group identifier, and each group identifier corresponds to a group of search space sets, and the first indication information includes the at least one group identifier, and the first indication information indicates the UE to skip monitoring the PDCCH in the search space sets that correspond to each group identifier and that are indicated by the first indication information.

Optionally, the first indication information is sent by using downlink control information DCI. For example, the DCI is group common signaling.

Certainly, the control information transmission apparatus provided in this embodiment of this application includes but is not limited to the foregoing modules. For example, the control information transmission apparatus may further include a storage unit. The storage unit may be configured to store program code of the control information transmission apparatus. All related content of the steps in the foregoing method embodiments may be cited in function descriptions of corresponding function modules. Details are not described herein again.

When the control information transmission apparatus is a base station or a chip in a base station, the sending unit 271 may be the transceiver 42 in FIG. 4. When the configuration unit 272 is configured to send the configuration information to another device (for example, UE), the configuration unit 272 may be the transceiver 42 in FIG. 4. When the configuration information is a default configuration of the base station, the configuration unit 272 may be the processor 41 in FIG. 4. When the control information transmission apparatus runs, the control information transmission apparatus performs the steps performed by the base station in the embodiment corresponding to FIG. 19.

Another embodiment of this application further provides a computer-readable storage medium. The computer-readable storage medium stores an instruction. When the instruction is run on a control information transmission apparatus, the control information transmission apparatus performs the control information transmission methods in the foregoing embodiments.

In another embodiment of this application, a computer program product is further provided. The computer program product includes a computer-executable instruction, and the computer-executable instruction is stored in a computer-readable storage medium. At least one processor of a control information transmission apparatus may read the computer-executable instruction from the computer-readable storage medium, and the at least one processor executes the computer-executable instruction, so that the control information transmission apparatus performs the control information transmission methods in the foregoing embodiments.

An embodiment of this application further provides a chip system. The chip system includes a processor, configured to support a control information transmission apparatus in implementing the foregoing control information transmission methods. In a possible design, the chip system further includes a memory. The memory is configured to store a program instruction and data of the control information transmission apparatus. Certainly, the memory may alternatively not exist in the chip system. The chip system may include a chip, or may include a chip and another discrete device. This is not specifically limited in this embodiment of this application.

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data terminal device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk solid state disk (SSD)), or the like.

The foregoing descriptions about implementations allow a person skilled in the art to understand that, for the purpose of convenient and brief description, division into the foregoing function modules is taken as an example for illustration. In actual application, the foregoing functions can be allocated to different function modules and implemented based on a requirement, that is, an inner structure of an apparatus is divided into different function modules to implement all or some of the functions described above.

In the several embodiments provided in this application, it should be understood that the disclosed apparatuses and methods may be implemented in other manners. For example, the described apparatus embodiments are merely used as an example. For example, division into modules or units is merely logical function division and may be another division manner in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may be one or more physical units, may be located at one place, or may be distributed at different places. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
receiving configuration information, wherein the configuration information comprises at least a first group identifier and a second group identifier, the first group identifier corresponds to a first group of search space sets, and the second group identifier corresponds to a second group of search space sets;
receiving first indication information, wherein the first indication information is related to the first group identifier and indicates user equipment (UE) to stop monitoring physical downlink control channel (PDCCH) on a first carrier which the first group of search space sets is on; and
stopping monitoring the PDCCH on the first carrier which the first group of search space sets is on.

2. The method according to claim 1, wherein receiving the first indication information comprises:
receiving the first indication information in a second carrier which a third group of search space sets is on.

3. The method according to claim 1, wherein the method further comprises:
receiving a second indication information, wherein the second indication information is related to the second group identifier and indicates the UE to monitor PDCCH on a third carrier which the second group of search space sets is on; and
monitoring the PDCCH on the third carrier which the second group of search space sets is on.

4. A method, comprising:
sending configuration information, wherein the configuration information comprises at least a first group identifier and a second group identifier, the first group identifier corresponds to a first group of search space sets, and the second group identifier corresponds to a second group of search space sets; and
sending first indication information, wherein the first indication information is related to the first group identifier and indicates user equipment (UE) to stop monitoring physical downlink control channel (PDCCH) on a first carrier which the first group of search space sets is on.

5. The method according to claim 4, wherein sending the first indication information comprises:
sending the first indication information in a second carrier which a third group of search space sets is on.

6. The method according to claim 4, wherein the method further comprises:
sending a second indication information, wherein the second indication information is related to the second group identifier and indicates the UE to monitor PDCCH on a third carrier which the second group of search space sets is on.

7. An apparatus, comprising one or more processors coupled to one or more memories storing programming instructions for execution by the one or more processors to cause the apparatus to perform a method comprising:
receiving configuration information, wherein the configuration information comprises at least a first group identifier and a second group identifier, the first group identifier corresponds to a first group of search space sets, and the second group identifier corresponds to a second group of search space sets;
receiving first indication information, wherein the first indication information is related to the first group identifier and indicates the apparatus to stop monitoring physical downlink control channel (PDCCH) on a first carrier which the first group of search space sets is on; and
stopping monitoring the PDCCH on the first carrier which the first group of search space sets is on.

8. The apparatus according to claim 7, wherein receiving the first indication information comprises:
receiving the first indication information in a second carrier which a third group of search space sets is on.

9. The apparatus according to claim 7, wherein the method further comprises:
receiving a second indication information, wherein the second indication information is related to the second group identifier and indicates the apparatus to monitor PDCCH on a third carrier which the second group of search space sets is on; and
monitoring the PDCCH on the third carrier which the second group of search space sets is on.

10. An apparatus, comprising one or more processors coupled to one or more memories storing programming instructions for execution by the one or more processors to cause the apparatus performs operations comprising:
sending configuration information, wherein the configuration information comprises at least a first group identifier and a second group identifier, the first group identifier corresponds to a first group of search space sets, and the second group identifier corresponds to a second group of search space sets; and
sending first indication information, wherein the first indication information is related to the first group identifier and indicates user equipment (UE) to stop monitoring physical downlink control channel (PDCCH) on a first carrier which the first group of search space sets is on.

11. The apparatus according to claim 10, wherein sending the first indication information comprises:
sending the first indication information in a second carrier which a third group of search space sets is on.

12. The apparatus according to claim 10, wherein the operations further comprise:
sending a second indication information, wherein the second indication information is related to the second group identifier and indicates the UE to monitor PDCCH on a third carrier which the second group of search space sets is on.

13. The method according to claim 1, wherein the first carrier is a secondary carrier.

14. The method according to claim 4, wherein the first carrier is a secondary carrier.

15. The apparatus according to claim 7, wherein the first carrier is a secondary carrier.

16. The apparatus according to claim 10, wherein the first carrier is a secondary carrier.

17. The method according to claim 3, wherein the first indication information and the second indication information is carried by downlink control information (DCI).

18. The method according to claim 6, wherein the first indication information and the second indication information is carried by downlink control information (DCI).

19. The apparatus according to claim 9, wherein the first indication information and the second indication information is carried by downlink control information (DCI).

20. The apparatus according to claim 12, wherein the first indication information and the second indication information is carried by downlink control information (DCI).

* * * * *